United States Patent
Murashima et al.

(10) Patent No.: US 7,313,293 B2
(45) Date of Patent: Dec. 25, 2007

(54) OPTICAL POWER MONITORING APPARATUS, OPTICAL POWER MONITORING METHOD, AND LIGHT RECEIVING DEVICE

(75) Inventors: Kiyotaka Murashima, Yokohama (JP); Akira Inoue, Yokohama (JP); Takeo Komiya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 64 days.

(21) Appl. No.: 11/076,018

(22) Filed: Mar. 10, 2005

(65) Prior Publication Data
US 2005/0232534 A1   Oct. 20, 2005

(30) Foreign Application Priority Data

| Mar. 16, 2004 | (JP) | ............................ P2004-075001 |
| Mar. 30, 2004 | (JP) | ............................ P2004-100440 |
| Mar. 31, 2004 | (JP) | ............................ P2004-104055 |

(51) Int. Cl.
*G02B 6/12* (2006.01)
(52) U.S. Cl. .......................................... 385/14; 385/89
(58) Field of Classification Search ................ 385/14, 385/89
See application file for complete search history.

(56) References Cited

U.S. PATENT DOCUMENTS

| 5,214,725 | A | * | 5/1993 | Yanagawa et al. ............. 385/45 |
| 5,278,929 | A | * | 1/1994 | Tanisawa et al. .............. 385/93 |
| 5,574,289 | A | * | 11/1996 | Aoki et al. ..................... 257/17 |
| 5,594,825 | A | * | 1/1997 | Kawasaki et al. ............. 385/60 |
| 5,701,375 | A | * | 12/1997 | Duck et al. .................... 385/74 |
| 5,799,118 | A | * | 8/1998 | Ogusu et al. .................. 385/14 |
| 5,938,811 | A | * | 8/1999 | Greene .......................... 65/385 |
| 6,466,707 | B1 | * | 10/2002 | Dawes et al. ................. 385/14 |

(Continued)

FOREIGN PATENT DOCUMENTS

| JP | 11-052199 | 2/1999 |
| WO | WO 97/06458 | 2/1997 |

OTHER PUBLICATIONS

"Integrated Tapped Photo Dectoector (Single Channel)", Santec Corporation Catalog, Jan. 2004, 2 pages.

(Continued)

*Primary Examiner*—Ellen E. Kim
(74) *Attorney, Agent, or Firm*—McDermott Will & Emery LLP

(57) ABSTRACT

An optical power monitoring apparatus according to an aspect of the present invention has an input optical waveguide, a light receiver, and an output optical waveguide. The input optical waveguide has a light entrance end and a light exit end. The input optical waveguide accepts light from the exterior through the light entrance end and outputs the light from the light exit end. The light receiver absorbs part of the light from the light exit end of the input optical waveguide and transmits the other part of the light. The output optical waveguide has a light entrance end and a light exit end. The output optical waveguide accepts the light transmitted by the light receiver, through the light entrance end, and outputs the light from the light exit end. The light receiver is provided on an optical path from the light exit end of the input optical waveguide to the light entrance end of the output optical waveguide.

48 Claims, 31 Drawing Sheets

U.S. PATENT DOCUMENTS

| | | | |
|---|---|---|---|
| 2003/0161583 A1* | 8/2003 | Kuhara | 385/49 |
| 2005/0147345 A1* | 7/2005 | Hata | 385/24 |
| 2006/0029328 A1* | 2/2006 | Takushima et al. | 385/33 |
| 2006/0029329 A1* | 2/2006 | Takushima et al. | 385/33 |
| 2006/0067629 A1* | 3/2006 | Hata | 385/83 |

OTHER PUBLICATIONS

Nakanishi et al., "Development of a 1.3 µm TCM Transceiver Module Using a Half-Transmittance Photodiode", SEI Technical Review, No. 48, Jun. 1999, pp. 38-43.

* cited by examiner (a)

(b)

OPTICAL POWER MONITORING APPARATUS, OPTICAL POWER MONITORING METHOD, AND LIGHT RECEIVING DEVICE

BACKGROUND OF THE INVENTION

1. Field of the Invention

The present invention relates to an optical power monitoring apparatus, an optical power monitoring method, and a light receiving device.

2. Related Background of the Invention

An apparatus for monitoring the power of an optical signal or the like under transmission is used in optical transmission systems and others. An optical power monitoring apparatus disclosed in PCT International Publication WO97/06458 has a first optical waveguide, a second optical waveguide, an optical filter, and a light receiver. The first optical waveguide and the second optical waveguide are arranged so that their respective end faces face each other. The optical filter is disposed in an inclined state between the respective end faces of the first optical waveguide and the second optical waveguide. The light receiver is provided beside the optical waveguides.

In this optical power monitoring apparatus, light propagates through the first optical waveguide and emerges from the end face thereof to the outside, part of the light is reflected by the optical filter, and the rest passes through the optical filter. The light passing through the optical filter is incident to the end face of the second optical waveguide and then propagates through the second optical waveguide. On the other hand, the light reflected by the optical filter is received by the light receiver. Then the light receiver outputs an electric signal at a value according to the power of the light received thereby, and the power of the light propagating from the first optical waveguide to the second optical waveguide is monitored based on this electric signal.

SUMMARY OF THE INVENTION

However, the conventional optical power monitoring apparatus as described above requires a large number of parts and it is, therefore, not easy to achieve adjustment in production.

An object of the present invention is thus to provide an optical power monitoring apparatus permitting easy production.

An optical power monitoring apparatus according to the present invention comprises an input optical waveguide, a light receiver, and an output optical waveguide. The input optical waveguide has a light entrance end and a light exit end, and is arranged to accept light from an exterior through the light entrance end into an interior thereof, guide the light, and output the light from the light exit end. The light receiver has an absorber layer for absorbing part of the light outputted from the light exit end of the input optical waveguide, and is arranged to output an electric signal at a value according to a power of light absorbed by the absorber layer, and transmit the other part of the light outputted from the light exit end of the input optical waveguide. The output optical waveguide has a light entrance end and a light exit end, and is arranged to accept the light transmitted by the light receiver, through the light entrance end into an interior thereof, guide the light, and output the light from the light exit end. This light receiver is located on an optical path from the light exit end of the input optical waveguide to the light entrance end of the output optical waveguide.

In this optical power monitoring apparatus, the light guided through the input optical waveguide and arriving at the light exit end thereof is outputted from the light exit end to the outside to be received by the light receiver. Part of the light received by the light receiver is absorbed in the absorber layer of the light receiver, and the light receiver outputs the electric signal at the value according to the power of the light absorbed by the absorber layer. On the other hand, the light transmitted without being absorbed among the light incident to the light receiver is incident to the light entrance end of the output optical waveguide, and enters the interior of the output optical waveguide through the light entrance end to be guided through the output optical waveguide. The input optical waveguide and the output optical waveguide may be optical fibers, or optical waveguides formed in a substrate.

The optical power monitoring apparatus according to the present invention preferably further comprises a fixing member for fixing a relative positional relation among the input optical waveguide, the light receiver, and the output optical waveguide.

In the optical power monitoring apparatus according to the present invention, each of an optical path between the light exit end of the input optical waveguide and the light receiver and an optical path between the light receiver and the light entrance end of the output optical waveguide is preferably filled with a light transmitting medium. This configuration is advantageous in fixing the light receiver and others and in protecting them as well.

In the optical power monitoring apparatus according to the present invention, a preferred configuration is such that a mode field diameter is expanded near the light exit end of the input optical waveguide and that a mode field diameter is expanded near the light entrance end of the output optical waveguide. In this configuration, NA of light emerging from the light exit end of the input optical waveguide becomes smaller and NA of light incident to the light entrance end of the output optical waveguide also becomes smaller. Therefore, it can suppress a transmission loss of the light from the light exit end of the input optical waveguide to the light entrance end of the output optical waveguide. Furthermore, since it can suppress broadening of light, it can reduce crosstalk between channels of light receivers in a configuration of a one-dimensional or two-dimensional array of input optical waveguides, output optical waveguides, and light receivers.

In the optical power monitoring apparatus according to the present invention, a preferred configuration is such that the mode field diameter is uniform in a predetermined longitudinal range including the light exit end of the input optical waveguide and that the mode field diameter is uniform in a predetermined longitudinal range including the light entrance end of the output optical waveguide. In this configuration, where the input optical waveguide and the output optical waveguide are made by cutting a single optical waveguide, positional accuracy in the cutting can be relaxed so as to facilitate production, if the mode field diameter is uniformly enlarged in a certain longitudinal range in the original optical waveguide.

In the optical power monitoring apparatus according to the present invention, a preferred configuration is such that the mode field diameter at the light exit end of the input optical waveguide is in a range of 20 μm to 70 μm and that the mode field diameter at the light entrance end of the output optical waveguide is in a range of 20 μm to 70 μm. In this case, an optical fiber having a refractive-index profile of the graded-index type can be suitably used as each of the input optical waveguide and the output optical waveguide, and thus the apparatus can be constructed in simple structure and inexpensively produced.

In a preferred configuration of the optical power monitoring apparatus according to the present invention, an optical axis near the light exit end of the input optical waveguide is parallel to an optical axis near the light entrance end of the output optical waveguide; the light exit end of the input optical waveguide, the light entrance end of the output optical waveguide, a light entrance surface of the light receiver facing the light exit end of the input optical waveguide, and a light exit surface of the light receiver facing the light entrance end of the output optical waveguide are parallel to each other and are inclined at a predetermined angle relative to a plane normal to the optical axes. This predetermined angle is preferably within a range of 1° to 8°. In a further preferred configuration in this case, the optical axis near the light exit end of the input optical waveguide deviates from the optical axis near the light entrance end of the output optical waveguide so as to compensate for a path deviation due to passage of light through the light receiver. In these configurations, even if part of the light emerging from the light exit end of the input optical waveguide and entering the light receiver is reflected by the light receiver, the reflected light can be prevented from returning to the input optical waveguide. It is also feasible to suppress an increase of the transmission loss of the light from the light exit end of the input optical waveguide to the light entrance end of the output optical waveguide.

In a preferred configuration of the optical power monitoring apparatus according to the present invention, a thickness of a region in the light receiver where the light outputted from the light exit end of the input optical waveguide and injected into the light entrance end of the output optical waveguide passes is smaller than a thickness of the other region in the light receiver. This configuration suppresses an increase of the transmission loss and facilitates handling of the light receiver in machining, packaging, and so on.

The light receiver in the optical power monitoring apparatus according to the present invention may be one different from a type of absorbing part of incident light and transmitting the other part of the incident light. For example, a potential configuration is such that the light receiver absorbs the whole of light entering the light receiver and that part of light is incident to the light receiver while the rest travels without entering the light receiver.

In a preferred configuration of the optical power monitoring apparatus according to the present invention, an optical fiber having a mode field diameter smaller than that of the input optical waveguide is connected to the light entrance end of the input optical waveguide; an optical fiber having a mode field diameter smaller than that of the output optical waveguide is connected to the light exit end of the output optical waveguide. For example, where the input optical waveguide and the output optical waveguide each originally have a large mode field diameter, a standard single-mode optical fiber may be connected to the light entrance end of the input optical waveguide or to the light exit end of the output optical waveguide.

The optical power monitoring apparatus according to the present invention can further comprise another input optical waveguide, another light receiver, and another output optical waveguide. The other input optical waveguide has a light entrance end and a light exit end, and is arranged to accept light from an exterior through the light entrance end into an interior thereof, guide the light, and output the light from the light exit end. The other light receiver has an absorber layer for absorbing part of light outputted from the light exit end of the other input optical waveguide, and is arranged to output an electric signal at a value according to a power of light absorbed by the absorber layer, and transmit the other part of the light outputted from the light exit end of the other input optical waveguide. The other output optical waveguide has a light entrance end and a light exit end, and is arranged to accept the light transmitted by the other light receiver, through the light entrance end into an interior thereof, guide the light, and output the light from the light exit end. The other light receiver is located on an optical path from the light exit end of the other input optical waveguide to the light entrance end of the other output optical waveguide. A set consisting of the input optical waveguide, the light receiver, and the output optical waveguide, and a set consisting of the other input optical waveguide, the other light receiver, and the other output optical waveguide are arranged in parallel. Namely, in the case of the plural sets of input optical waveguides, light receivers, and output optical waveguides, these sets may be arranged in a one-dimensional or two-dimensional array. In this case, it is feasible to achieve a high packaging density.

The optical power monitoring apparatus according to the present invention can further comprise N−1 (where N is an integer of not less than 2) other light receivers. Each of the other light receivers has an absorber layer for absorbing part of light outputted from the light exit end of the input optical waveguide, and is arranged to output an electric signal at a value according to a power of light absorbed by the absorber layer and transmit the other part of the light outputted from the light exit end of the input optical waveguide. The N light receivers consisting of the light receiver and the N−1 other light receivers are serially arrayed on the optical path from the light exit end of the input optical waveguide to the light entrance end of the output optical waveguide. Wavelength dependences of respective acceptance sensitivities of the N light receivers are different from each other. The light transmitted by the N light receivers after outputted from the light exit end of the input optical waveguide travels through the light entrance end of the output optical waveguide and is outputted from the light exit end of the output optical waveguide.

In a preferred configuration, thicknesses of the respective absorber layers of the N light receivers are different from each other. In another preferred configuration, respective absorption coefficients of the N light receivers are also different from each other. These configurations are advantageous in making the wavelength dependences of the respective acceptance sensitivities of the N light receivers different from each other.

In a preferred configuration a ratio of respective acceptance sensitivities of any two light receivers out of the N light receivers monotonically increases or monotonically decreases at least in a continuous wavelength band of not less than 20 nm. In another preferred configuration, a ratio of respective acceptance sensitivities of any two light receivers out of the N light receivers monotonically increases or monotonically decreases in a wavelength band consisting of at least one of the O-band, the S-band, the C-band, the L-band, and the U-band.

An optical power monitoring method according to the present invention is a method using the above optical power monitoring apparatus according to the present invention as described above, and the method is characterized by monitoring a power of light on the basis of respective electric signals outputted from the N light receivers with input of the light into the optical power monitoring apparatus and detecting a wavelength of the light. Another preferred aspect of the method is to determine an operating situation of the optical power monitoring apparatus on the basis of the respective electric signals outputted from the N light receivers. In a preferred aspect, the number of wavelengths of light to be detected is not more than (N−1), and a ratio of respective acceptance sensitivities of any two light receivers out of the N light receivers monotonically increases or monotonically decreases in a range of the wavelengths of light to be detected. In another preferred aspect, the number of wavelengths of light to be detected is not more than N, each of the wavelengths is known, and a ratio of respective acceptance sensitivities of any two light receivers out of the N light receivers differs depending upon each wavelength of light to be detected. In another preferred aspect, a power and a wavelength of light are detected based on a mathematical expression or a table indicating the wavelength dependences of respective acceptance sensitivities of the N light receivers and based on the output electric signals.

The optical power monitoring apparatus according to the present invention can further comprise an optical thin film having a reflectance of not less than 97% in a wavelength band consisting of at least one of the O-band, the S-band, the C-band, the L-band, and the U-band. The light receiver further has a first surface on which the optical thin film is provided. The absorber layer of the light receiver is located on the optical path from the light exit end of the input optical waveguide to the light entrance end of the output optical waveguide. The light exit end of the input optical waveguide and the light entrance end of the output optical waveguide are optically coupled by reflection on the optical thin film.

In the optical power monitoring apparatus of this configuration, the absorber layer is preferably located on either one of an optical path from the light exit end of the input optical waveguide to the first surface and an optical path from the first surface to the light entrance end of the output optical waveguide.

The optical power monitoring apparatus of this configuration can further comprise another input optical waveguide and another output optical waveguide. The other input optical waveguide has a light entrance end and a light exit end, and is arranged to accept light from an exterior through the light entrance end into an interior thereof, guide the light, and output the light from the light exit end. The other output optical waveguide has a light entrance end and a light exit end, and is arranged to accept the light transmitted by the light receiver, through the light entrance end into an interior thereof, guide the light, and output the light from the light exit end. The absorber layer of the light receiver is further located on an optical path from the light exit end of the other input optical waveguide to the light entrance end of the other output optical waveguide. The light receiver transmits part of light absorbed by the absorber layer after outputted from the light exit end of the other input optical waveguide, and outputs an electric signal at a value according to a power of light absorbed by the absorber layer. The light exit end of the other input optical waveguide and the is light entrance end of the other output optical waveguide are optically coupled by reflection on the optical thin film. In this configuration, an optical waveguide structure between the light receiver and each of the input optical waveguide, the output optical waveguide, the other input optical waveguide, and the other output optical waveguide is preferably a planar lightguide.

The optical power monitoring apparatus according to the present invention can further comprise another input optical waveguide, another light receiver, another optical waveguide, and an optical thin film. The other input optical waveguide has a light entrance end and a light exit end, and is arranged to accept light from an exterior through the light entrance end into an interior thereof, guide the light, and output the light from the light exit end. The other light receiver has an absorber layer for absorbing part of light outputted from the light exit end of the other input optical waveguide, and is arranged to output an electric signal at a value according to a power of light absorbed by the absorber layer and transmit the other part of the light outputted from the light exit end of the other input optical waveguide. The other output optical waveguide has a light entrance end and a light exit end, and is arranged to accept the light transmitted by the other light receiver, through the light entrance end into an interior thereof, guide the light, and output the light from the light exit end. The optical thin film has a reflectance of not less than 97% in a wavelength band consisting of at least one of the O-band, the S-band, the C-band, the L-band, and the U-band. The other light receiver is located on an optical path from the light exit end of the other input optical waveguide to the light entrance end of the other output optical waveguide. The optical thin film is located between the light receiver and the other light receiver. The absorber layer of the light receiver is located between the optical thin film and at least one of the light exit end of the input optical waveguide and the light entrance end of the output optical waveguide. The absorber layer of the other light receiver is located between the optical thin film and at least one of the light exit end of the other input optical waveguide and the light entrance end of the other output optical waveguide. The light exit end of the input optical waveguide and the light entrance end of the output optical waveguide are optically coupled by reflectance on the optical thin film. The light exit end of the other input optical waveguide and the light entrance end of the other output optical waveguide are optically coupled by reflection on the optical thin film.

The optical power monitoring apparatus according to the present invention can further comprise another output optical waveguide and an optical thin film. The other output optical waveguide has a light entrance end and a light exit end, and is arranged to guide light injected through the light entrance end into an interior thereof, and output the light from the light exit end. The optical thin film has a reflectance of 47%-53% in a wavelength band consisting of at least one of the O-band, S-band, C-band, L-band, and U-band. The optical thin film is located between the light exit end of the input optical waveguide and the light entrance end of the output optical waveguide. The light exit end of the input optical waveguide and the light entrance end of the output optical waveguide are optically coupled by transmission through the optical thin film. The light exit end of the input optical waveguide and the light entrance end of the other output optical waveguide are optically coupled by reflection on the optical thin film. Alternatively, the optical power monitoring apparatus according to the present invention can comprise an optical thin film whose reflectance has a wavelength dependence, instead of the optical thin film having the reflectance of 47%-53% in the above configuration. Here the optical thin film is preferably located between the absorber layer and the light entrance end of the output optical waveguide. Namely, where the light receiver has a first surface on the input optical waveguide side and a second surface on the output optical waveguide side, the optical thin film may be formed on this second surface.

The optical power monitoring apparatus according to the present invention can further comprise another output optical waveguide, a first optical thin film, and a second optical thin film. The other output optical waveguide has a light entrance end and a light exit end, and is arranged to guide light injected through the light entrance end into an interior thereof and output the light from the light exit end. The first optical thin film has a reflectance of 47%-53% in a wavelength band consisting of at least one of the O-band, S-band, C-band, L-band, and U-band. The second optical thin film has a reflectance of not less than 97% in the foregoing wavelength band. The light receiver further has a first surface on which the first optical thin film is disposed, and a second surface on which the second optical thin film is disposed. The absorber layer of the light receiver is located between the first surface and the second surface. The light exit end of the input optical waveguide and the light entrance end of the output optical waveguide are optically coupled by transmission through the first optical thin film and by reflection on the second optical thin film. The light exit end of the input optical waveguide and the light entrance end of the other output optical waveguide are optically coupled by reflection on the first optical thin film. Alternatively, the optical power monitoring apparatus according to the present invention can comprise a first optical thin film whose reflectance has a wavelength dependence, instead of the first optical thin film having the reflectance of 47%-53% in the above configuration. In this configuration the first optical thin film is preferably located on only the optical path from the light exit end of the input optical waveguide to the light entrance end of the output optical waveguide.

The optical power monitoring apparatus according to the present invention can further comprise another light receiver, another output optical waveguide, and an optical thin film. The other light receiver has an absorber layer for absorbing part of light outputted from the light exit end of the input optical waveguide, and is arranged to output an electric signal at a value according to a power of light absorbed by the absorber layer, and transmit the other part of the light outputted from the light exit end of the input optical waveguide. The other output optical waveguide has a light entrance end and a light exit end, and is arranged to accept light from the other light receiver through the light entrance end into an interior thereof, guide the light, and output the light from the light exit end. The optical thin film has a reflectance of 47%-53% in a wavelength band consisting of at least one of the O-band, S-band, C-band, L-band, and U-band. The optical thin film is located between the light receiver and the other light receiver. The absorber layer of the light receiver is located between the light exit end of the input optical waveguide and the optical thin film. The absorber layer of the other light receiver is located between the optical thin film and the light entrance end of the other output optical waveguide. The light exit end of the input optical waveguide and the light entrance end of the output optical waveguide are optically coupled by reflection on the optical thin film. The light exit end of the input optical waveguide and the light entrance end of the other output optical waveguide are optically coupled by transmission through the optical thin film. Alternatively, the optical power monitoring apparatus according to the present invention can comprise an optical thin film whose reflectance has a wavelength dependence, instead of the optical thin film having the reflectance of 47%-53% in the above configuration. Here the wavelength dependences of respective acceptance sensitivities of the light receiver and the other light receiver are preferably different from each other.

In the optical power monitoring apparatus described above, the optical waveguides optically coupled with the light receiver are preferably those having an expanded core.

A light receiving device according to the present invention comprises (1) a light receiver for absorbing part of incident light by an absorber layer, outputting an electric signal at a value according to a power of the absorbed light, and transmitting the rest of the incident light; and (2) an optical thin film formed on at least one surface of the light receiver and having a reflectance of not less than 3% in a wavelength band consisting of at least one of the O-band, S-band, C-band, L-band, and U-band. In a preferred configuration, the optical thin film is formed on a surface on the absorber layer side of the light receiver; a convex lens is formed on a surface opposite to the surface on the absorber layer side of the light receiver.

Another light receiving device according to the present invention comprises (1) a first light receiver for absorbing part of incident light by an absorber layer, outputting an electric signal at a value according to a power of the absorbed light, and transmitting the rest of the incident light; (2) a second light receiver provided on one side of the first light receiver, for absorbing part of incident light by an absorber layer, outputting an electric signal at a value according to a power of the absorbed light, and transmitting the rest of the incident light; and (3) an optical thin film formed between the first light receiver and the second light receiver and having a reflectance of not less than 3% in a wavelength band consisting of at least one of the O-band, S-band, C-band, L-band, and U-band. In a preferred configuration, wavelength dependences of respective acceptance sensitivities of the first light receiver and the second light receiver are different from each other, and the reflectance of the optical thin film has a wavelength dependence.

In this light receiving device, the optical thin film is formed on a surface of the light receiver which absorbs only part of incident light. The reflectance of this optical thin film is not less than 3% and preferably not less than 5% in the wavelength band consisting of at least one of the O-band, S-band, C-band, L-band, and U-band. The reflection on the optical thin film may be total reflection (at the reflectance of not less than 97%), or partial reflection (at the reflectance of 47%-53%), or may have a wavelength dependence.

The optical power monitoring apparatus according to the present invention can comprise the above-stated light receiving device according to the present invention.

DESCRIPTION OF THE PREFERRED EMBODIMENTS

The best mode for carrying out the present invention will be described below in detail with reference to the accompanying drawings. Identical or similar elements will be denoted by the same reference symbols in the description of the drawings, without redundant description. An xyz orthogonal coordinate system is used in each drawing for convenience' sake of description.

Figure 1:
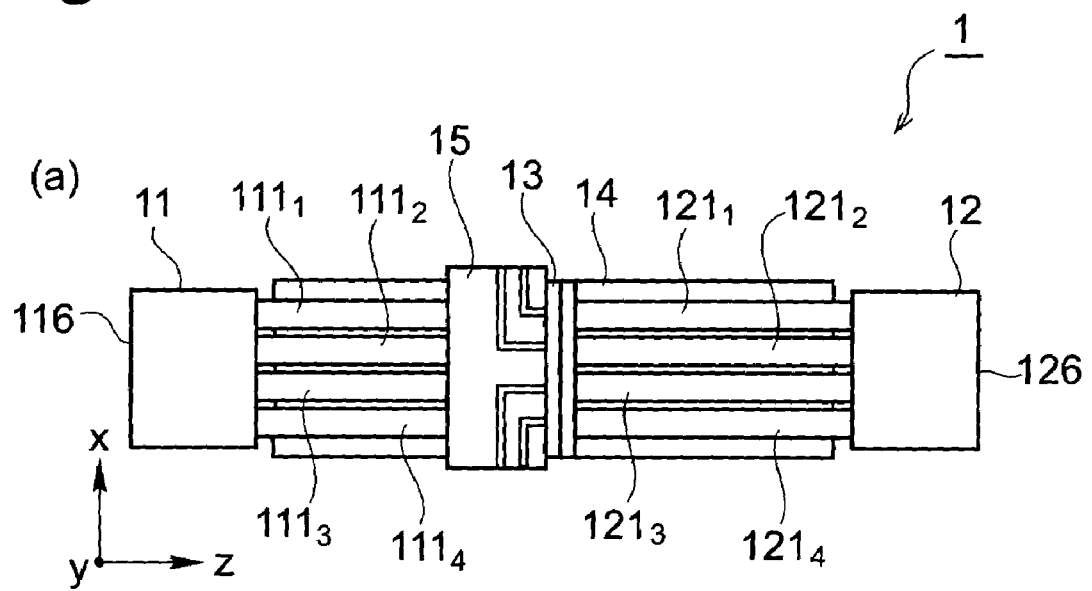
FIG. 1 is an illustration showing a configuration of an optical power monitoring apparatus according to an embodiment of the present invention.
Figure 1:
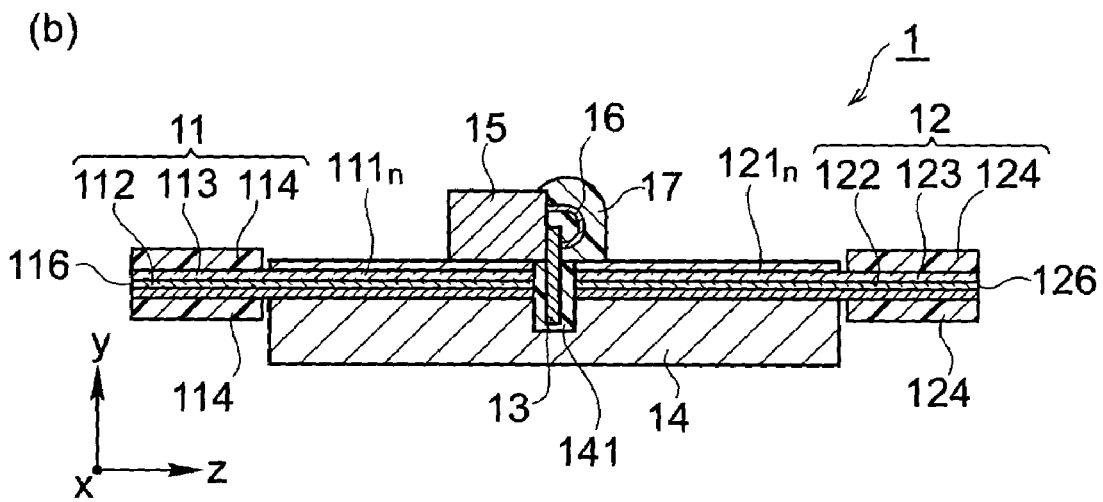
Figure 2:
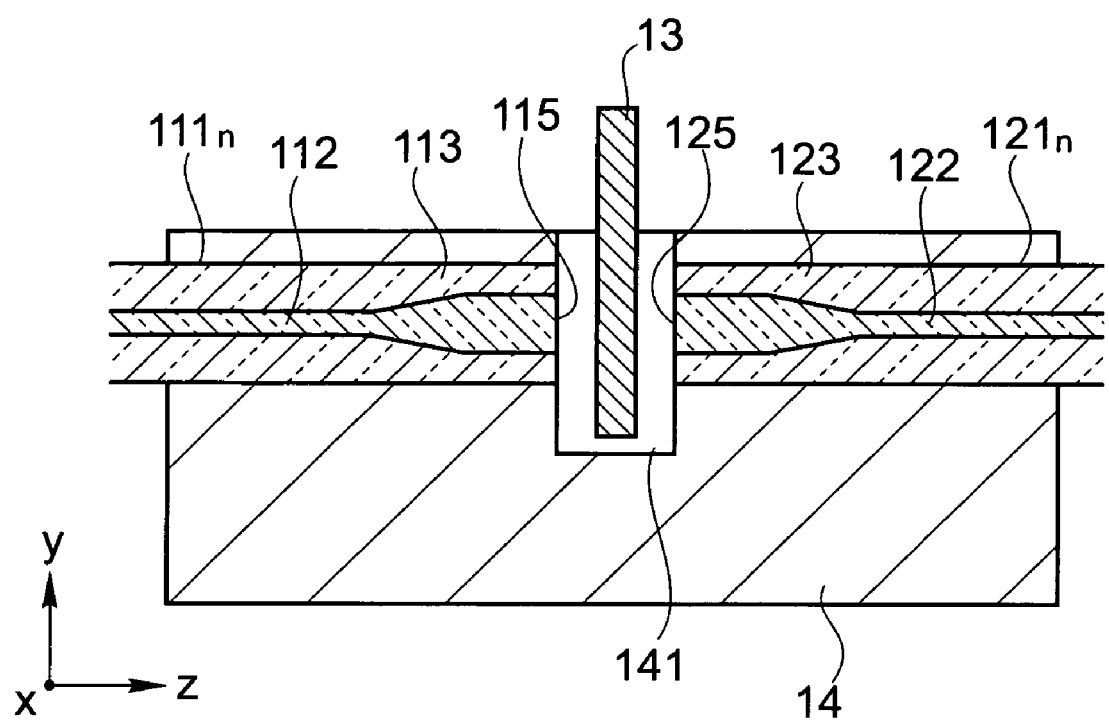
FIG. 2 is an enlarged sectional view of a region around a light receiver array in the optical power monitoring apparatus according to the embodiment of the present invention.
Figure 3:
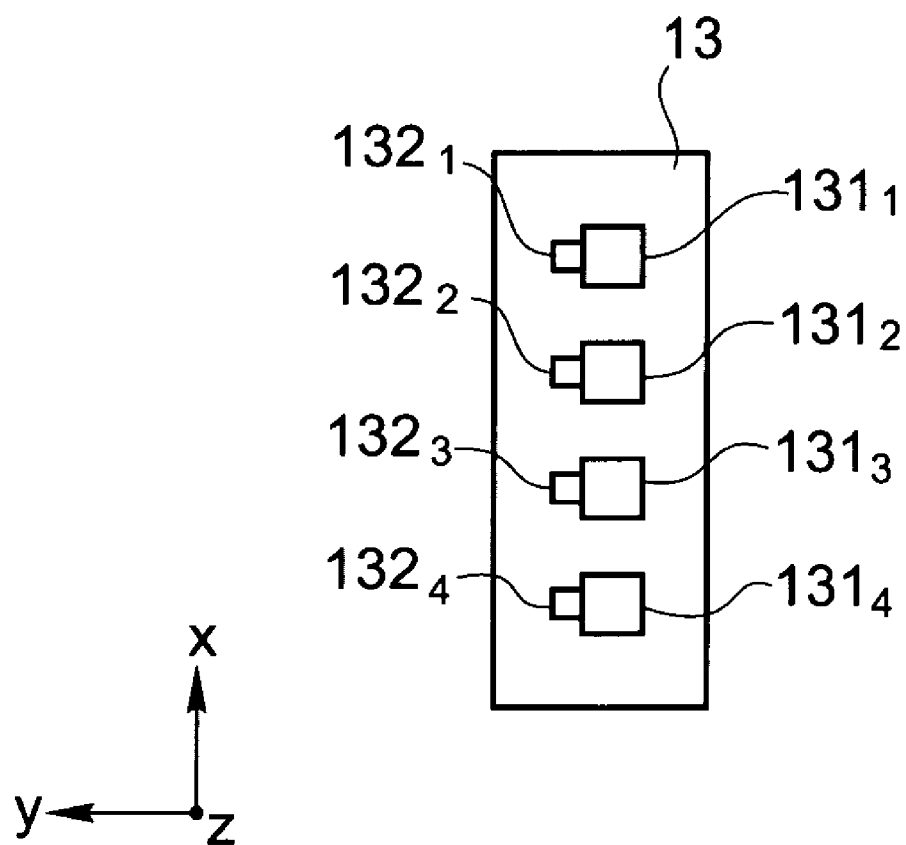
FIG. 3 is an illustration to illustrate a light receiver array included in the optical power monitoring apparatus according to the embodiment of the present invention.

FIG. 1 is an illustration showing a configuration of an optical power monitoring apparatus according to an embodiment of the present invention. In FIG. 1, (a) is a plan view, and (b) a sectional view. The optical power monitoring apparatus 1 shown in FIG. 1 has first optical fibers $111_1$-$111_4$, second optical fibers $121_1$-$121_4$, a light receiver array 13, and a fixing member 14. FIG. 2 is an enlarged sectional view of a region around the light receiver array in the optical power monitoring apparatus according to the embodiment of the present invention. FIG. 3 is an illustration to illustrate the light receiver array included in the optical power monitoring apparatus according to the embodiment of the present invention.

As shown in FIG. 1, the respective optical axes of the first optical fibers $111_1$-$111_4$ and second optical fibers $121_1$-$121_4$ are parallel to each other, and the direction of the optical axes is defined as a z-direction. The first optical fibers $111_1$-$111_4$ are arranged in parallel, and the second optical fibers $121_1$-$121_4$ are also arranged in parallel. The plane where the optical fibers are arranged in parallel is defined as an xz plane.

Each of the first optical fibers $111_1$-$111_4$ is an optical fiber included in a 4-fiber ribbon 11, and a ribbon coating 114 of the ribbon 11 is removed in a predetermined range including end faces of the fibers. The first optical fibers are arranged in parallel on the fixing member 14. Similarly, each of the second optical fibers $121_1$-$121_4$ is an optical fiber included in a 4-fiber ribbon 12, and a ribbon coating 124 of the ribbon 12 is removed in a predetermined range including the end faces of the fibers. The second optical fibers are arranged in parallel on the fixing member 14.

Four mutually parallel V-grooves extending along the z-direction are formed in an upper surface of the fixing member 14, and a groove 141 is formed across these four V-grooves. The first optical fibers $111_1$-$111_4$ are placed and fixed on the four V-grooves on one side with respect to this groove 141. The second optical fibers $121_1$-$121_4$ are placed and fixed on the four V-grooves on the other side with respect to this groove 141. The light receiver array 13 is inserted in the groove 141 of the fixing member 14.

As shown in FIG. 2, each first optical fiber $111_n$ has a core region 112 with a high refractive index, and a cladding region 113 surrounding this core region 112. Each second optical fiber $121_n$ has a core region 122 with a high refractive index, and a cladding region 123 surrounding this core region 122. Each of light exit end 115 of first optical fiber $111_n$ and light entrance end 125 of second optical fiber $121_n$ fronts on the groove 141 of the fixing member 14.

As shown in FIG. 3, the light receiver array 13 includes four transmission type light receivers $131_1$-$131_4$ arrayed along the x-direction. The array spacing of the light receivers $131_n$ is the same as the array spacing of the first optical fibers $111_n$ and the second optical fibers $121_n$. The light exit end 115 of first optical fiber $111_n$ and the light entrance end 125 of second optical fiber $121_n$ face each other with the light receiver $131_n$ in between. Namely, the light receiver $131_n$ is located on an optical path from the light exit end 115 of first optical fiber $111_n$ to the light entrance end 125 of second optical fiber $121_n$. In the specification, n represents an arbitrary integer of not less than 1 and not more than 4.

Referring again to FIG. 1, the first optical fiber $111_n$ accepts light from the exterior through the light entrance end 116 into its interior, guides the incident light, and outputs the light from the light exit end 115 to the outside (the space of the groove 141 of the fixing member 14). The light receiver $131_n$ accepts the light outputted from the light exit end 115 of first optical fiber $111_n$, absorbs part of the incident light by an absorber layer, outputs an electric signal at a value according to the power of the light absorbed by the absorber layer, and transmits the rest of the incident light. The second optical fiber $121_n$ accepts the light transmitted by the light receiver $131_n$, through the light entrance end 125, into its interior, guides the light, and outputs the light from the light exit end 126. The fixing member 14 is a member for fixing the relative positional relation among the first optical fiber $111_n$, light receiver $131_n$, and second optical fiber $121_n$.

A sub-mount 15 secures the light receiver array 13. The sub-mount 15 is electrically connected through a wire 16 with each pad $132_n$ electrically connected to associated light receiver $131_n$ on the light receiver array 13, accepts an electric signal outputted from each light receiver $131_n$, through the pad $132_n$ and wire 16, and outputs this electric signal to the outside.

Each of an optical path between the light exit end 115 of the first optical fiber $111_n$ and the light receiver $131_n$ and an optical path between the light receiver $131_n$ and the light entrance end 125 of second optical fiber $121_n$ is filled with a light transmitting medium 17. The light transmitting medium 17 is also located around the wires 16. The light transmitting medium 17 is a medium with high optical transparency at wavelengths of light subjected to monitoring of power (e.g., wavelengths of optical signals used in optical communication), and is, for example, an acrylic resin. This light transmitting medium 17 functions not only to fix the light receiver array 13 in the groove 141 of the fixing member 14, but also to protect the light receivers $131_n$ and wires 16.

In a preferred configuration, an optical connector as optical coupling means for injection/emission of light into or from external optical fibers or the like is provided on both or either of the side of light entrance end 116 of first optical fiber $111_n$ and the side of light exit end 126 of second optical fiber $121_n$. This configuration permits this optical power monitoring apparatus 1 to be readily inserted at an arbitrary position. In another preferred configuration, the apparatus is also provided with electric terminals for outputting the electric signals from the light receivers $131_n$ to the outside, together with the optical connector. In this configuration, optical coupling and electrical connection are simultaneously achieved, whereby the electric signals indicating the monitor results can be readily extracted to the outside.

Figure 4:
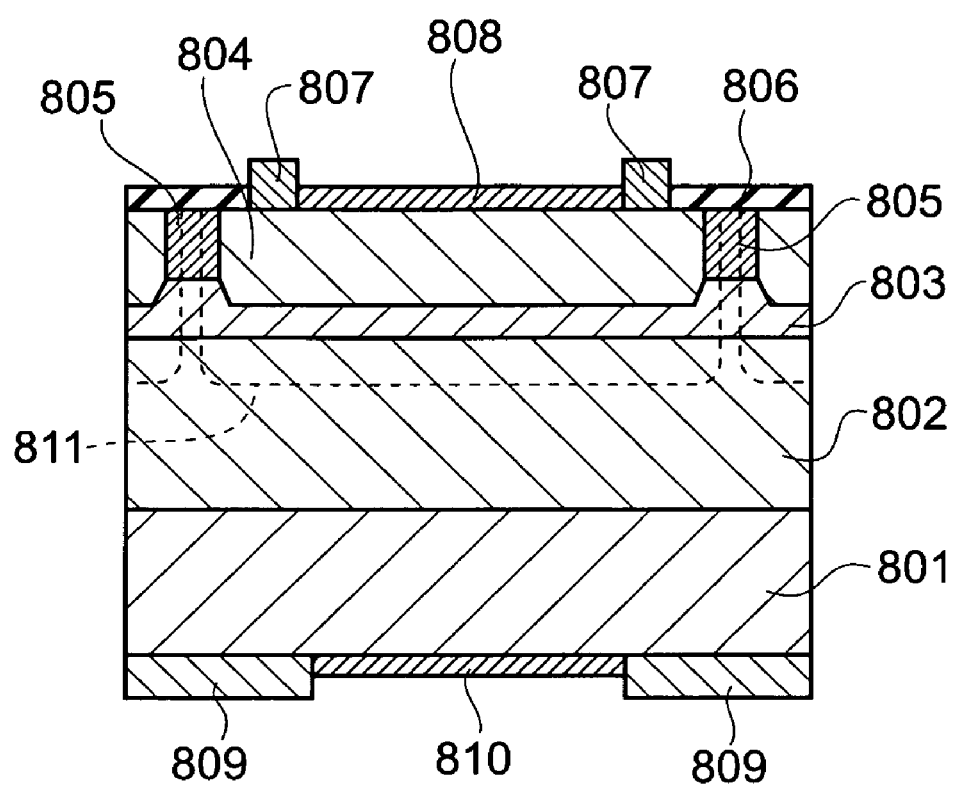
FIG. 4 is an illustration showing an example of sectional structure of a light receiver.

FIG. 4 is an illustration showing an example of sectional structure of a light receiver. The light receiver shown in this figure is constructed as follows: an n⁻ type InP buffer layer 802 and an n⁻ type InGaAsP layer 803 are formed in order on an n-type InP substrate 801; a p⁺ type InP region 804 and an n⁻ type InP region 805 are formed in the n⁻ type InGaAsP layer 803; a passivation film 806, an anode electrode 807, and a reflection reducing film 808 are further formed thereon. On the other hand, a cathode electrode 809 and a reflection reducing film 810 are formed on the back surface of the n-type InP substrate 801. In the structure shown in this figure, the n⁻ type InGaAsP layer 803 as an absorber layer is present in the entire region between the reflection reducing film 808 and the reflection reducing film 810 which light enters or leaves. In the light receiver of this structure (i.e., a photodiode), a reverse bias voltage is applied between anode electrode 807 and cathode electrode 809, and a charge is generated in pn junction part 811 with incidence of light into the reflection reducing film 808 or into the reflection reducing film 810. The charge is outputted from the anode electrode 807 and cathode electrode 809. The amount of the charge outputted indicates the power of incident light.

Figure 5:
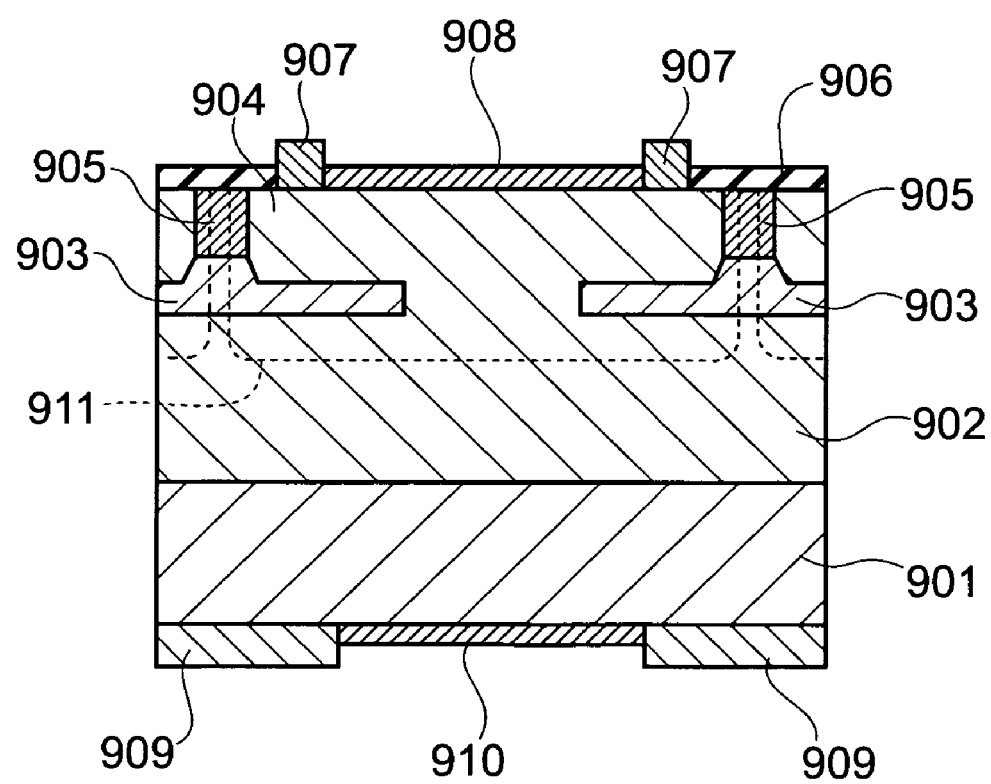
FIG. 5 is an illustration showing another example of sectional structure of a light receiver.

FIG. 5 is an illustration showing another example of sectional structure of a light receiver. The light receiver shown in this figure is constructed as follow: an n⁻ type InP buffer layer 902 and an n⁻ type InGaAsP layer 903 are formed in order on an n-type InP substrate 901; a p⁺ type InP region 904 and an n⁻ type InP region 905 are formed in the n⁻ type InGaAsP layer 903; a passivation film 906, an anode electrode 907, and a reflection reducing film 908 are further formed thereon. On the other hand, a cathode electrode 909 and a reflection reducing film 910 are formed on the back surface of the n-type InP substrate 901. In the structure shown in this figure, the n⁻ type InGaAsP layer 903 as an absorber layer is absent in a part of the region between the reflection reducing film 908 and the reflection reducing film 910 which light enters or leaves. In the light receiver of this structure (i.e., a photodiode), a reverse bias voltage is applied between the anode electrode 907 and the cathode electrode 909, and a charge is generated in pn junction part 911 near the n⁻ type InGaAsP layer 903 with incidence of light into the reflection is reducing film 908 or into the reflection reducing film 910. The charge is outputted from the anode electrode 907 and cathode electrode 909. The amount of the charge outputted represents the power of incident light. In this structure, light incident to the portion without the n⁻ type InGaAsP layer 903 is transmitted and outputted.

The optical power monitoring apparatus 1 constructed as described above operates as follows. Light injected through the light entrance end 116 of optical fiber $111_n$ of the first ribbon 11 into the interior of the optical fiber $111_n$ is guided by the optical fiber $111_n$. The light guided by the optical fiber $111_n$ is outputted from the light exit end 115 of optical fiber $111_n$ to the outside. The light outputted from the light exit end 115 of optical fiber $111_n$ travels through light transmitting medium 17 filling the groove 141, and then enters the corresponding light receiver $131_n$. Part of the light incident into the light receiver $131_n$ is absorbed by the absorber layer of light receiver $131_n$, and the light receiver $131_n$ outputs an electric signal at a value according to the power of light absorbed by the absorber layer. The electric signal is outputted via pad $132_n$, wire 16, and sub-mount 15 to the outside. On the other hand, the light transmitted without being absorbed among the light incident into the light receiver $131_n$ is injected through the light entrance end 125 of optical fiber $121_n$ of the second ribbon 12 into the interior of the optical fiber $121_n$. This light is guided by the optical fiber $121_n$ and is outputted from the light exit end 126 of the optical fiber $121_n$ to the outside.

The optical power monitoring apparatus 1 of this configuration is smaller in the number of parts and thus easier in adjustment in production than the conventional apparatus. The adjustment in production is easy, particularly, in cases where there are plural sets (four sets in the present embodiment) of first optical fibers $111_n$, second optical fibers $121_n$, and light receivers $131_n$ and where these sets are arranged in parallel. Since the transmission type light receiver $131_n$ disposed between the light exit end 115 of first optical fiber 111n and the light entrance end 125 of second optical fiber $121_n$ monitors the power of the light guided from the first optical fiber $111_n$ to the second optical fiber $121_n$, the distance can be set short between the light exit end 115 of first optical fiber $111_n$ and the light receiver $131_n$, and this can suppress broadening of light from the light exit end 115, so as to suppress the problem of crosstalk.

Referring again to FIG. 2, the mode field diameter is preferably expanded near the light exit end 115 of first optical fiber $111_n$, and the mode field diameter is also preferably expanded near the light entrance end 125 of second optical fiber $121_n$. This results in decreasing NA of light emerging from the light exit end 115 of first optical fiber $111_n$ and also decreasing NA of light incident to the light entrance end 125 of second optical fiber $121_n$, which suppresses the transmission loss of light from the light exit end 115 of first optical fiber $111_n$ to the light entrance end 125 of second optical fiber $121_n$. Particularly, since the thickness of light receiver $131_n$ is relatively large, 100 μm or more, it is important to increase the mode field diameter and thereby decrease NA as described above. The problem of crosstalk can also be suppressed by this configuration.

This expansion of the mode field diameter can be implemented by diffusion of a dopant into the core regions 112, 122 by heating. It can also be implemented by another method of doping a part of cladding regions 113, 123 near around the core regions 112, 122 with $GeO_2$ and increasing the refractive index of the $GeO_2$-doped region by irradiation with ultraviolet light. It may also be implemented by another method of fusion-splicing optical fibers of a different kind with a larger mode field diameter. Preferably, the mode field diameter varies in a tapered shape in terms of reduction of loss, and a change rate of the mode field diameter in the longitudinal direction in the tapered part is preferably not more than 0.003.

In a preferred configuration the mode field diameter is uniform in a predetermined longitudinal range including the light exit end 115 of first optical fiber $111_n$; the mode field diameter is uniform in a predetermined longitudinal range including the light entrance end 125 of second optical fiber $121_n$. In a case where in forming the groove 141 of fixing member 14, a single optical fiber ribbon is cut at the same time as it, to obtain the first ribbon 11 and the second ribbon 12 by the cutting, the positional accuracy in the cutting is relaxed and the production becomes easier if the mode field diameter is uniformly expanded in a certain longitudinal range of each optical fiber included in the original fiber ribbon.

The mode field diameter at the light exit end 115 of first optical fiber $111_n$ is preferably in the range of 20 μm to 70 μm, and the mode field diameter at the light entrance end 125 of second optical fiber $121_n$ is preferably in the range of 20 μm to 70 μm. In this case, since an optical fiber having a refractive-index profile of the graded-index type can be suitably used as each of the first optical fibers $111_n$ and the second optical fibers $121_n$, the structure becomes simple and the apparatus can be inexpensively produced.

Figure 6:
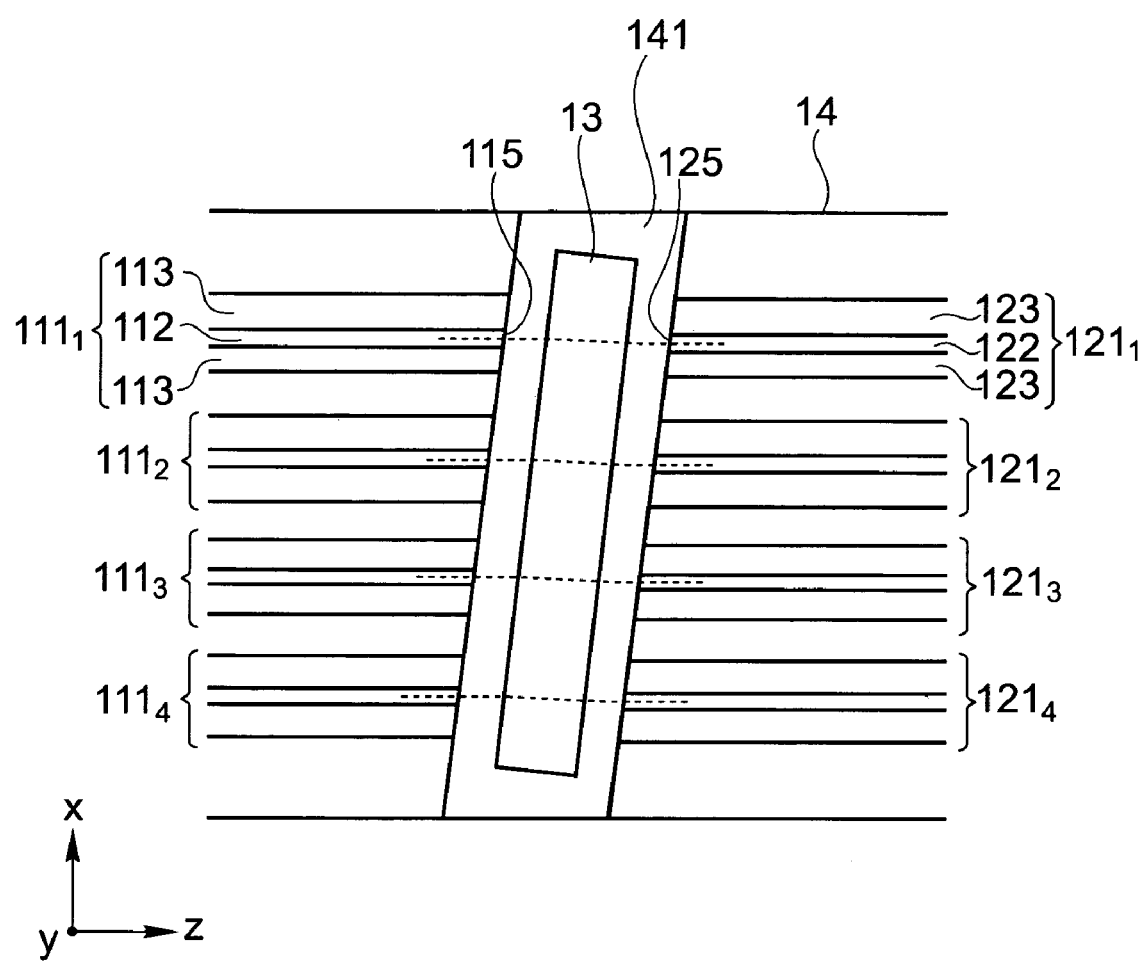
FIG. 6 is an enlarged plan view of a region around a light receiver array in the optical power monitoring apparatus according to the embodiment of the present invention.

FIG. 6 is an enlarged plan view of a region around the light receiver array in the optical power monitoring apparatus 1 according to the embodiment of the present invention. As shown in this figure, the optical axis near the light exit end 115 of the first optical fiber $111_n$ and the optical axis near the light entrance end 125 of the second optical fiber $121_n$ both are parallel to the z-axis and parallel to each other. The light exit end 115 of each first optical fiber $111_n$, the light entrance end 125 of each second optical fiber $121_n$, the light entrance surface of each light receiver $131_n$ facing the light exit end 115 of first optical fiber $111_n$, and the light exit surface of light receiver $131_n$ facing the light entrance end 125 of second optical fiber $121_n$ are parallel to each other, and are inclined each at a predetermined angle relative to the xy plane normal to the optical axes. This predetermined angle is preferably in the range of 1° to 8°.

Thanks to this inclined arrangement, even if part of light entering the light receiver $131_n$ after outputted from the light exit end 115 of first optical fiber $111_n$ is reflected by the light receiver $131_n$, the reflected light will be prevented from returning to the first optical fiber $111_n$.

On the other hand, since the refractive index of the light receiver $131_n$ is, for example, about 3.5, if the angle of inclination is too large, the optical path of light emerging after transmitted by the light receiver $131_n$ deviates largely from the optical path of light entering the light receiver $131_n$. Therefore, supposing the respective optical axes of the first optical fiber $111_n$ and the second optical fiber $121_n$ are located on an identical straight line, the transmission loss of light will be large from the light exit end 115 of first optical fiber $111_n$ to the light entrance end 125 of second optical fiber $121_n$. Therefore, in order to suppress the increase of this transmission loss, the angle of inclination is preferably not more than 8°.

In another preferred configuration the optical axis near the light exit end 115 of each first optical fiber $111_n$ deviates from the optical axis near the light entrance end 125 of the associated second optical fiber $121_n$ so as to compensate for a path deviation due to passage of light through the light receiver $131_n$. This configuration can also suppress the increase of the transmission loss of light from the light exit end 115 of first optical fiber $111_n$ to the light entrance end 125 of second optical fiber $121_n$. Such axial deviation may be made during assembly or may be made by shape of the V-grooves in the upper surface of the fixing member 14. The axial deviation can also be made, for example, by a difference between respective diameters of the fibers, an offset of respective cores of the fibers, diffusion of a dopant into the core region by heating, and an increase of the refractive index around the core region by irradiation with ultraviolet light.

Figure 7:
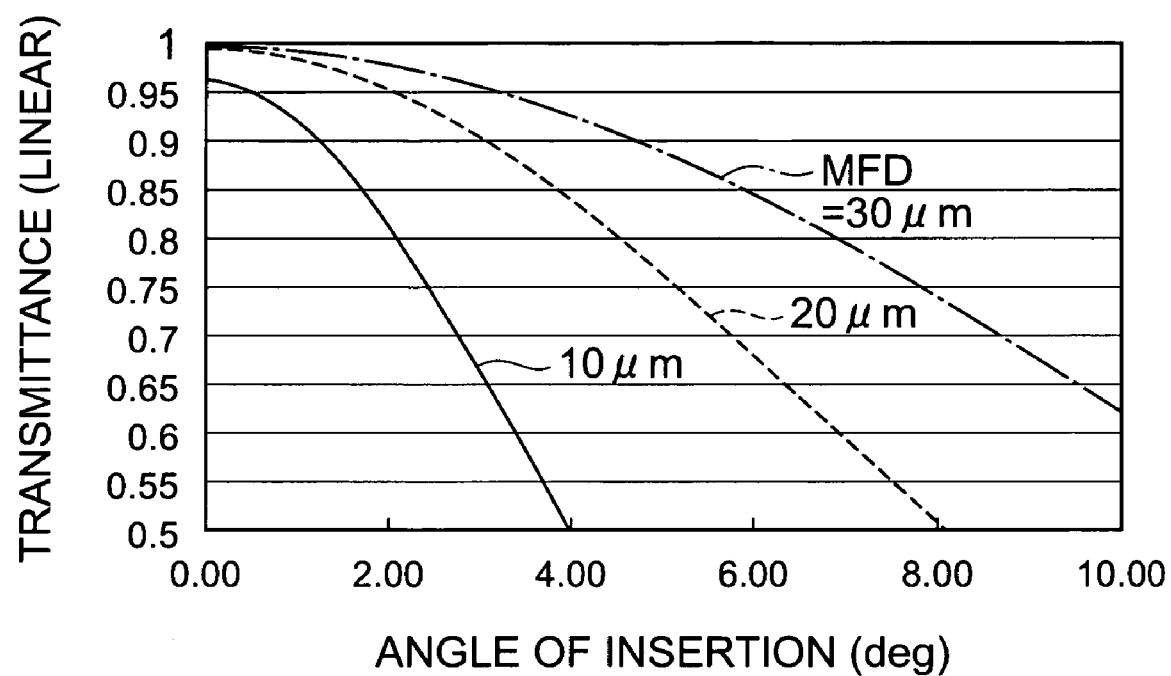
FIG. 7 is a graph showing the relationship between transmittance and insertion angle of the light receiver array.
Figure 8:
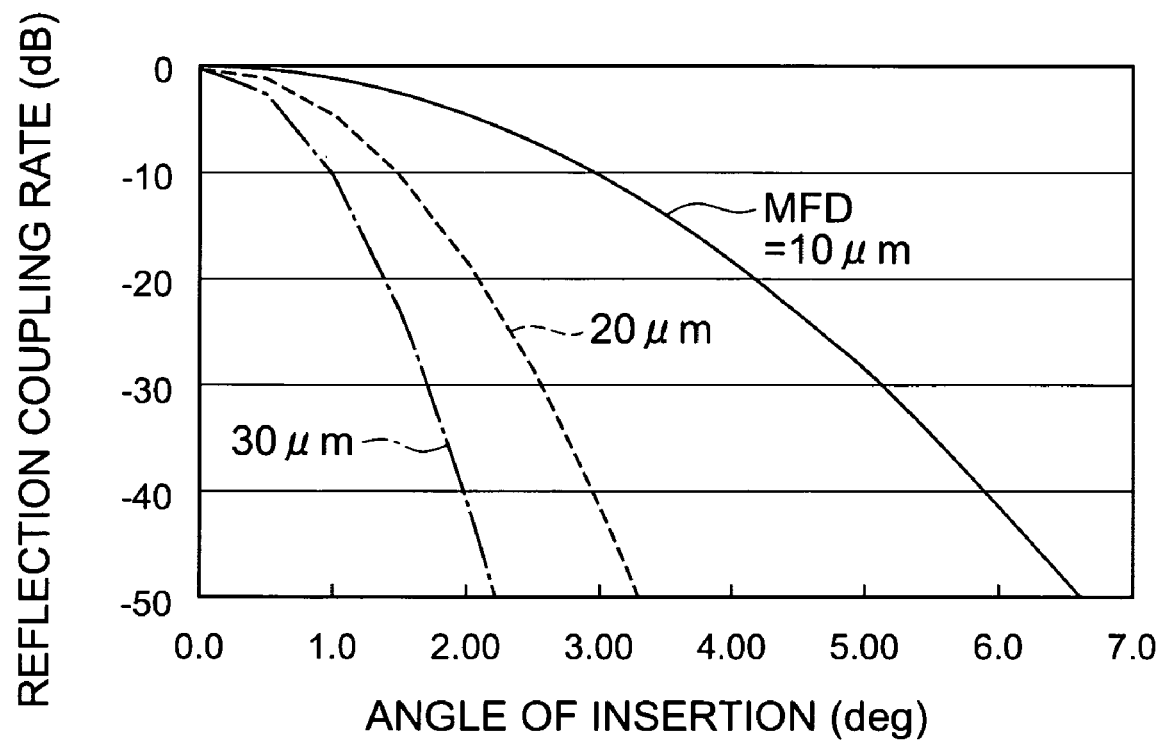
FIG. 8 is a graph showing the relationship between reflection coupling rate and insertion angle of the light receiver array.

FIG. 7 is a graph showing the relationship between transmittance and angle of insertion of the light receiver array. FIG. 8 is a graph showing the relationship between coupling rate of reflection and angle of insertion of the light receiver array. These figures show cases where the respective mode field diameters (MFDs) of the first optical fiber $111_n$ and second optical fiber $121_n$ are 10 μm, 20 μm, and 30 μm. It was assumed herein that the refractive index of the light receiver $131_n$ was 3.5 and the spacing between the light exit end 115 of first optical fiber $111_n$ and the light entrance end 125 of second optical fiber $121_n$ was 100 μm. As seen from these figures, as NA decreases with increase in the mode field diameter, the tolerance of the inclination angle becomes narrower and the slope of reduction of the reflection attenuation amount relative to the inclination angle becomes steeper.

The thickness of light receiver $131_n$ is desirably as small as possible in order to suppress the increase of the transmission loss, while it is also important that the light receiver array 13 be easy to handle during machining, packaging, or the like. Therefore, a preferred configuration of the light receiver $131_n$ is such that the thickness of the region through which the light outputted from the light exit end 115 of the first optical fiber $111_n$ and entering the light entrance end 125 of the second optical fiber $121_n$ passes is smaller than the thickness of the other region. Each of FIGS. 9 to 11 is an illustration showing an example of a cross section of a light receiver.

Figure 9:
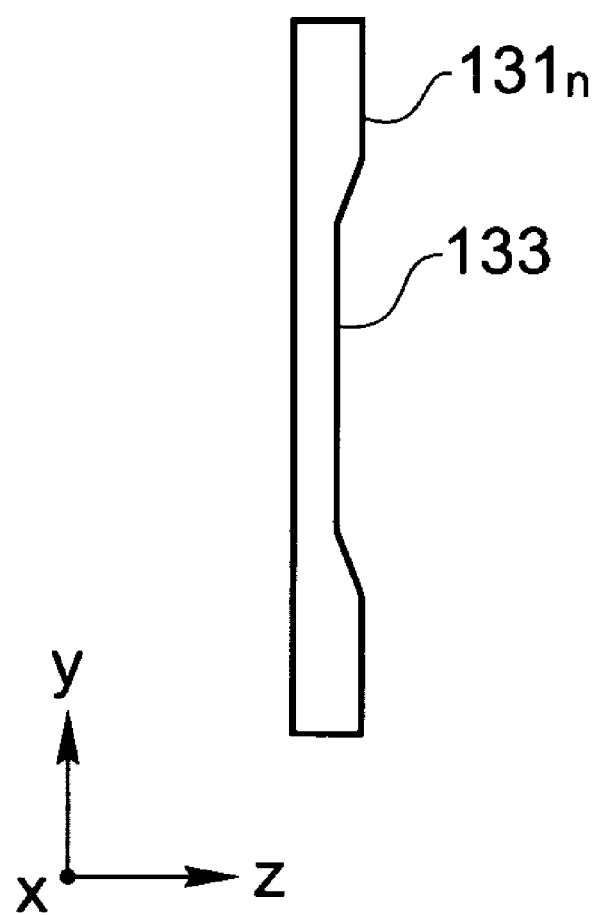
FIG. 9 is an illustration showing an example of a cross section of a light receiver.

As shown in FIG. 9, a region 133 where the light passes in the light receiver $131_n$ as a semiconductor light receiving element is formed in a thickness smaller than the thickness of the other region, and in this case packaging is easy. In another example, as shown in FIG. 10, the light receiver is formed by fixing a light receiving portion $131_n$ as a semiconductor light receiving element to a base 134 of flat plate shape, and a region 135 where the light passes in the base 134 is made of a light transmitting material (e.g., polyimide). In this case, there is no need for extra machining of the light receiving portion $131_n$ as a semiconductor light receiving element. In still another example, as shown in FIG. 11, the light receiver is made by fixing a light receiving portion $131_n$ as a semiconductor light receiving element to a base 136 of flat plate shape, and an aperture is formed in a region 137 where the light passes in the base 136. In this case, there is no need for extra machining of the light receiving portion $131_n$ as a semiconductor light receiving element.

Figure 10:
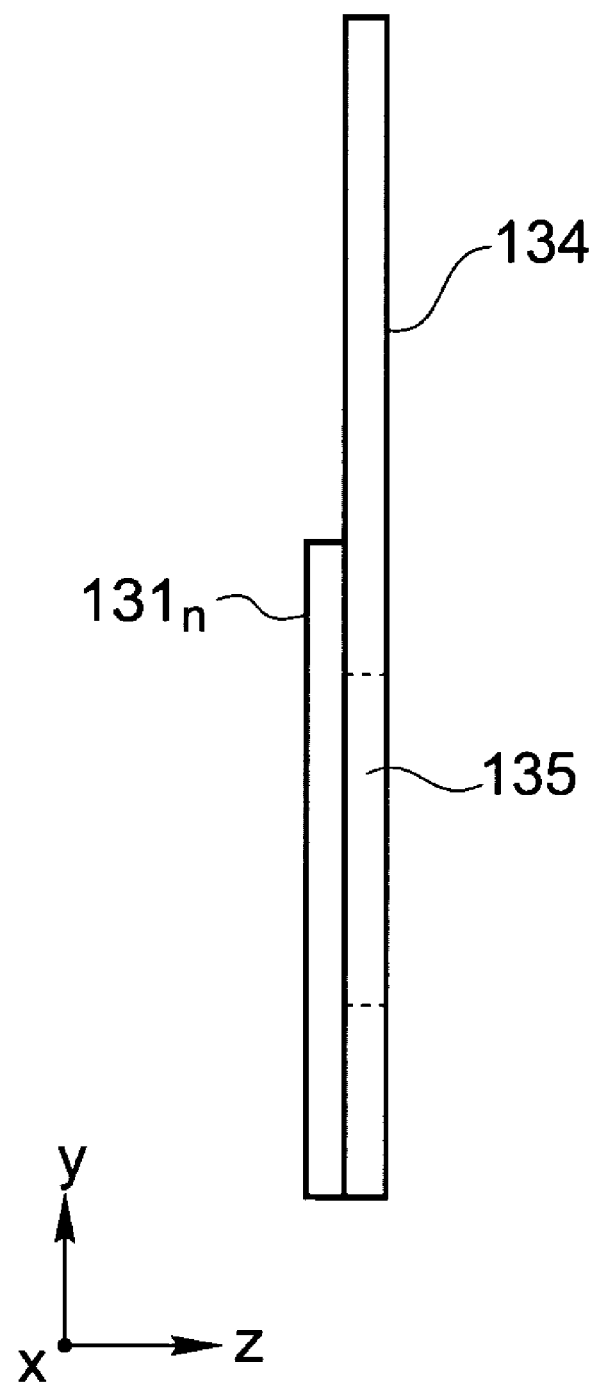
FIG. 10 is n illustration showing an example of a cross section of a light receiver.
Figure 11:
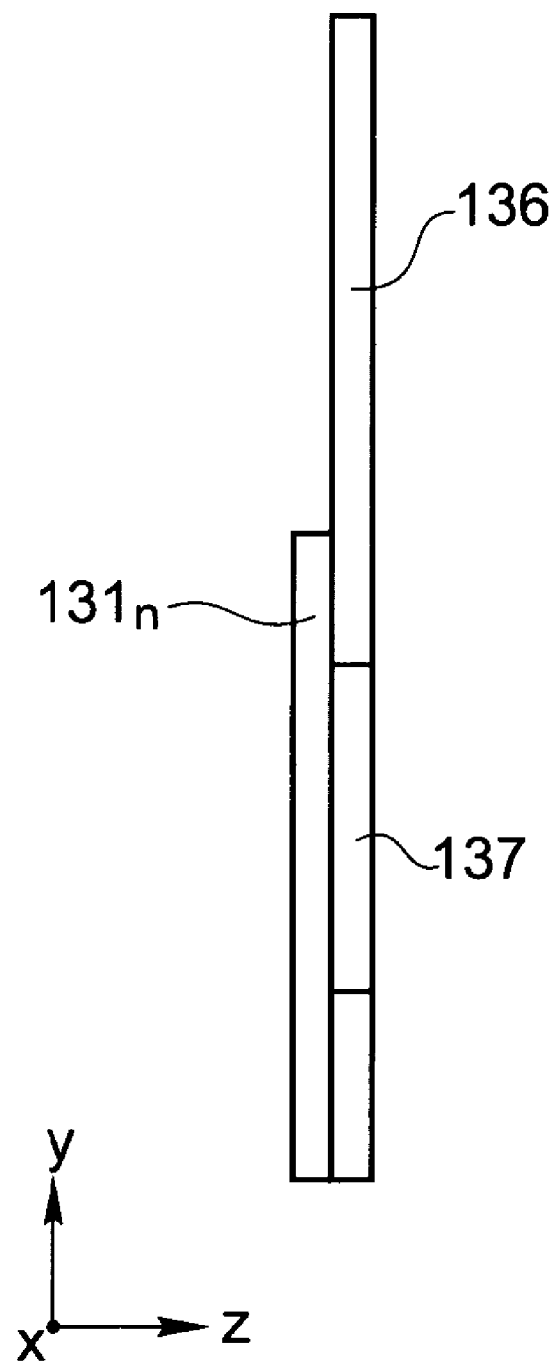
FIG. 11 is an illustration showing an example of a cross section of a light receiver.

The light receiver $131_n$ in the structure as shown in FIG. 5 requires highly accurate adjustment of the relative positional relation among the light exit end 115 of first optical fiber $111_n$, the light entrance end 125 of second optical fiber $121_n$, and the light receiver $131_n$, and the adjustment of the relative positional relation becomes easier by the implementation of the structures shown in FIGS. 9 to 11.

The optical power monitoring apparatus 1 described above was provided with the four sets of first optical fibers 111, light receivers 131, and second optical fibers 121, and these four sets were one-dimensionally arranged in parallel. However, as shown in FIG. 12, the optical power monitoring apparatus may also be provided with plural sets of first optical fibers, light receivers, and second optical fibers so that these sets may be two-dimensionally arranged in parallel.

Figure 12:
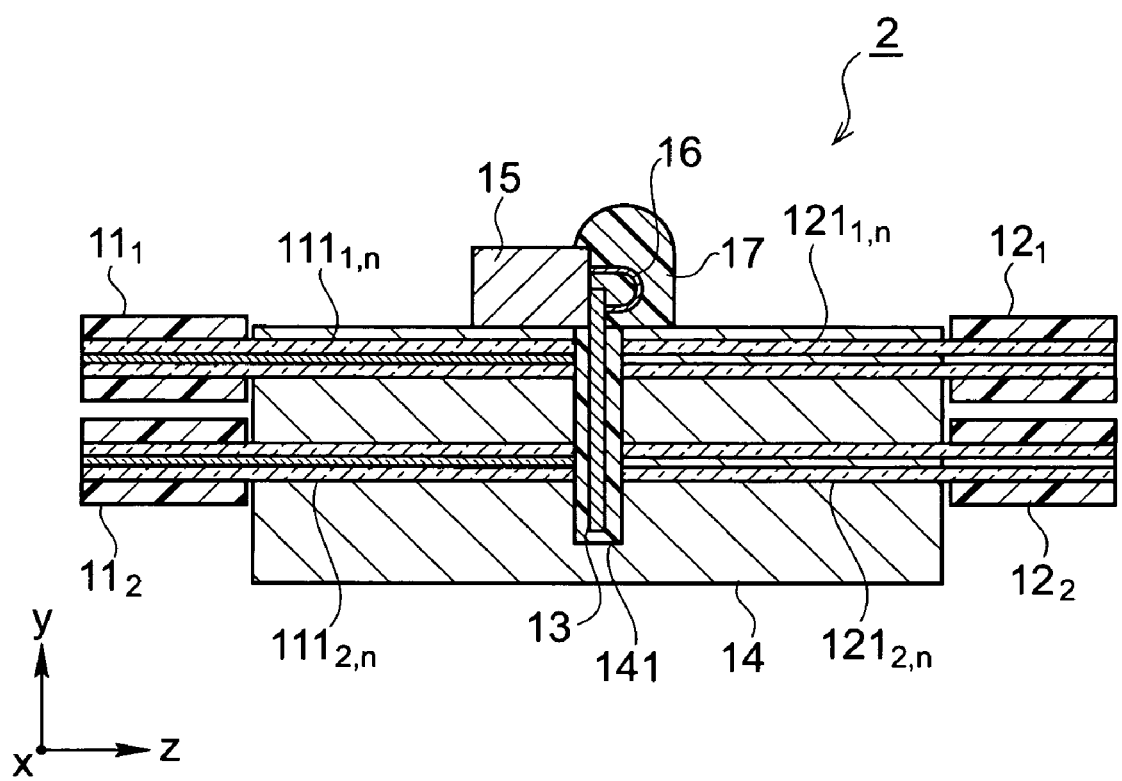
FIG. 12 is a sectional view of an optical power monitoring apparatus according to another embodiment of the present invention.
Figure 13:
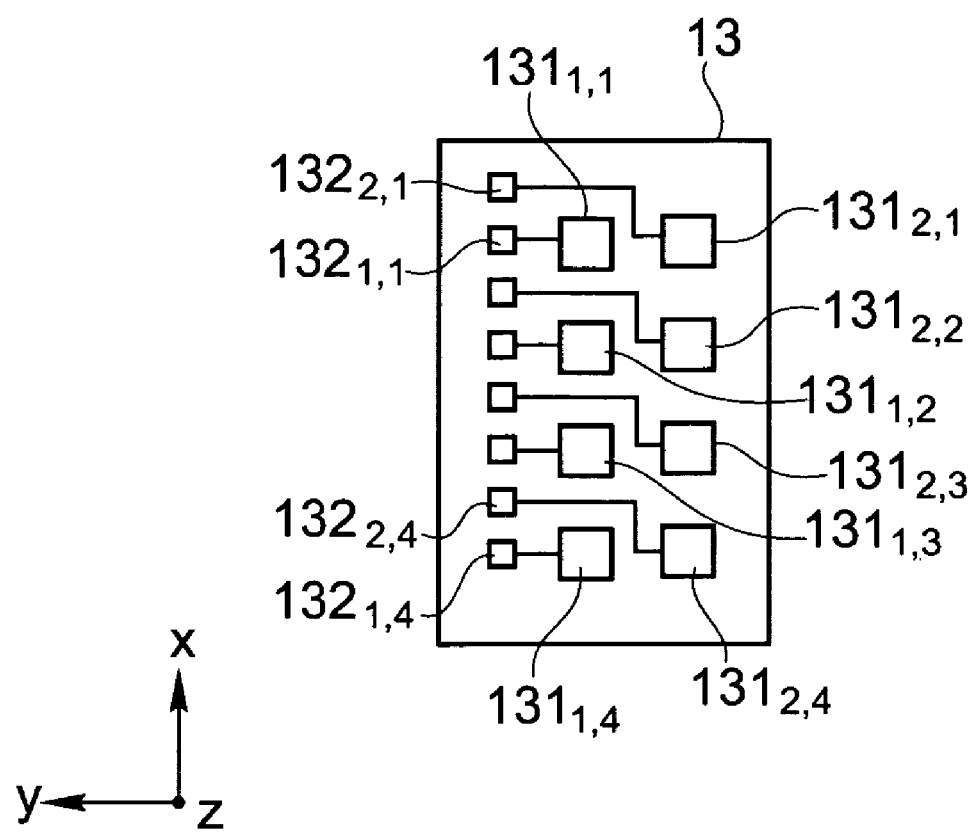
FIG. 13 is an illustration to illustrate a light receiver array in the optical power monitoring apparatus according to the other embodiment of the present invention.

FIG. 12 is a sectional view of an optical power monitoring apparatus according to another embodiment of the present invention. The optical power monitoring apparatus 2 shown in this figure has first optical fibers $111_{1,1}$-$111_{1,4}$, first optical fibers $111_{2,1}$-$111_{2,4}$, second optical fibers $121_{1,1}$-$121_{1,4}$, second optical fibers $121_{2,1}$-$121_{2,4}$, a light receiver array 13, and a fixing member 14. A plan view of the optical power monitoring apparatus 2 is similar to that shown in (a) in FIG. 1. FIG. 13 is an illustration to illustrate the light receiver array included in the optical power monitoring apparatus according to the other embodiment of the present invention.

As shown in FIG. 12, the optical respective axes of the first optical fiber $111_{m,n}$ and the second optical fiber $121_{m,n}$ are parallel to each other and the direction of the optical axes is defined as a z-direction. Here m represents 1 or 2, and n an arbitrary integer of not less than 1 and not more than 4. The first optical fibers $111_{1,1}$-$111_{1,4}$ are arranged in parallel, and the first optical fibers $111_{2,1}$-$111_{2,4}$ are also arranged in parallel. The second optical fibers $121_{1,1}$-$121_{1,4}$ are also arranged in parallel, and the second optical fibers $121_{2,1}$-$121_{2,4}$ are also arranged in parallel. A plane where the optical fibers are arranged in parallel is defined as an xz plane.

Each of the first optical fibers $111_{1,1}$-$111_{1,4}$ is an optical fiber included in a 4-fiber ribbon $11_1$, and a ribbon coating is removed in a predetermined range of the fiber ribbon including the end face. The optical fibers $111_{1,1}$-$111_{1,4}$ are arranged in parallel on the fixing member 14. Each of the first optical fibers $111_{2,1}$-$111_{2,4}$ is an optical fiber included in a 4-fiber ribbon $11_2$, and a ribbon coating is removed in a predetermined range of the fiber ribbon including the end face. The optical fibers $111_{2,1}$-$111_{2,4}$ are arranged in parallel in the fixing member 14. Each of the second optical fibers $121_{1,1}$-$121_{1,4}$ is an optical fiber included in a 4-fiber ribbon $12_1$, and a ribbon coating is removed in a predetermined range of the fiber ribbon including the end face. The optical fibers $121_{1,1}$-$121_{1,4}$ are arranged in parallel on the fixing member 14. Each of the second optical fibers $121_{2,1}$-$121_{2,4}$ is an optical fiber included in a 4-fiber ribbon $12_2$, and a ribbon coating is removed in a predetermined range of the fiber ribbon including the end face. The optical fibers $121_{2,1}$-$121_{2,4}$ are arranged in parallel in the fixing member 14.

As shown in FIG. 13, the light receiver array 13 includes four transmission type light receivers $131_{1,1}$-$131_{1,4}$ arrayed along the x-direction and four transmission type light receivers $131_{2,1}$-$131_{2,4}$ also arrayed along the x-direction. The light exit end of first optical fiber $111_{m,n}$ and the light entrance end of second optical fiber $121_{m,n}$ face each other with the light receiver $131_{m,n}$ in between. Namely, the light receiver $131_{m,n}$ is located on the optical path from the light exit end of first optical fiber $111_{m,n}$ to the light entrance end of second optical fiber $121_{m,n}$.

Referring again to FIG. 12, the first optical fiber $111_{m,n}$ guides light from the exterior injected through the light entrance end thereof and outputs the light from the light exit end to the outside (the space of groove 141 of the fixing member 14). The light receiver $131_{m,n}$ accepts the light outputted from the light exit end of first optical fiber $111_{m,n}$, absorbs part of the incident light by an absorber layer, outputs an electric signal at a value according to the power of the absorbed light, and transmits the rest of the incident light. The second optical fiber $121_{m,n}$ accepts the light transmitted by the light receiver $131_{m,n}$, through the light entrance end to its interior, guides the light, and outputs the light from the light exit end. The fixing member 14 is a member for fixing the relative positional relation among the first optical fiber $111_{m,n}$, the light receiver $131_{m,n}$, and the second optical fiber $121_{m,n}$.

Sub-mount 15 secures the light receiver array 13. The sub-mount 15 is electrically connected through a wire 16 with a pad $132_{m,n}$ electrically connected to the light receiver $131_{m,n}$ on the light receiver array 13, receives an electric signal outputted from the light receiver $131_{m,n}$, through the pad $132_{m,n}$ and wire 16, and outputs this electric signal to the outside.

Each of an optical path between the light exit end of first optical fiber $111_{m,n}$ and the light receiver $131_{m,n}$ and an optical path between the light receiver $131_{m,n}$ and the light entrance end of second optical fiber $121_{m,n}$ is filled with a light transmitting medium 17. The light transmitting medium 17 is also provided around the wires 16. The light transmitting medium 17 is a medium with high optical transparency at wavelengths of light subject to monitoring of power (e.g., wavelengths of optical signals used in optical communication), and is, for example, an acrylic resin. This light transmitting medium 17 functions not only to secure the light receiver array 13 in the groove 141 of the fixing member 14, but also to protect the light receivers $131_{m,n}$ and wires 16.

The optical power monitoring apparatus 2 constructed as described above operates as follows. Light entering the light entrance end of optical fiber $111_{m,n}$ of the first ribbon $11_m$ travels through the interior of optical fiber $111_{m,n}$ to be outputted from the light exit end thereof. The light outputted from the light exit end of optical fiber $111_{m,n}$ passes through the light transmitting medium 17 filling the groove 141, and then enters the light receiver $131_{m,n}$. Part of the light entering the light receiver $131_{m,n}$ is absorbed by the absorber layer of the light receiver $131_{m,n}$, and the light receiver $131_{m,n}$ outputs an electric signal at a value according to the power of the absorbed light. The electric signal is outputted via pad $132_{m,n}$, wire 16, and sub-mount 15 to the outside. On the other hand, the light transmitted without being absorbed among the light entering the light receiver $131_{m,n}$ is incident to the light entrance end of optical fiber $121_{m,n}$ of the second ribbon $12_m$, goes through the light entrance end into the interior of the optical fiber $121_{m,n}$, travels inside the optical fiber $121_{m,n}$, and is outputted from the light exit end of optical fiber $121_{m,n}$.

The optical power monitoring apparatus 2 constructed as described above is able to achieve the effect similar to that by the aforementioned optical power monitoring apparatus 1. In addition, this optical power monitoring apparatus 2 has the eight sets of first optical fibers 111, light receivers 131, and second optical fibers 121 and these eight sets are two-dimensionally arranged in parallel in the array of 2×4, thereby achieving a high packaging density.

Figure 14:
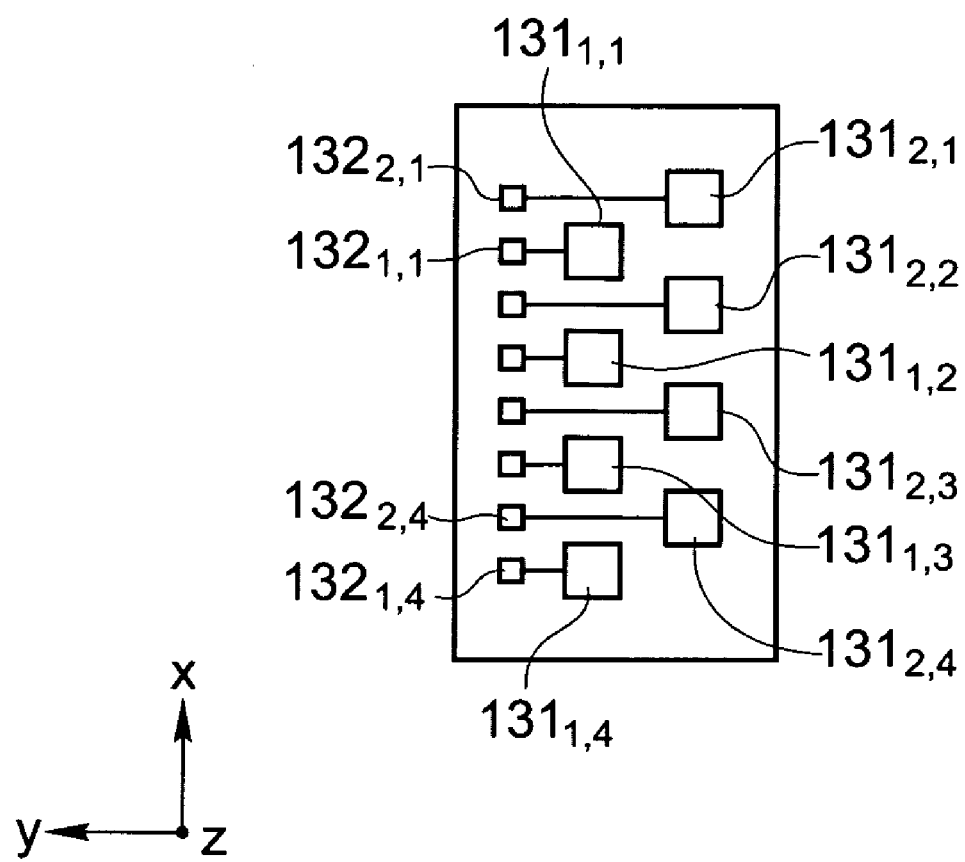
FIG. 14 is an illustration to illustrate another configuration of the light receiver array included in the optical power monitoring apparatus according to the other embodiment of the present invention.

The four light receivers $131_{1,1}$-$131_{1,4}$ and the four light receivers $131_{2,1}$-$131_{2,4}$ in the light receiver array 13 shown in FIG. 13 are arranged so that one set of four light receivers can be superimposed on the other set of four light receivers if translated in parallel along the y-direction. However, the light receiver array may also be arranged like the light receiver array 13 shown in FIG. 14: the four light receivers $131_{1,1}$-$131_{1,4}$ and the four light receivers $131_{2,1}$-$131_{2,4}$ are arranged so that one set of four light receivers can be superimposed on the other set of four light receivers if translated in parallel along the y-direction and further translated in parallel along the x-direction (by a distance equal to half of the x-directional array pitch of the light receivers).

The first optical fibers and second optical fibers in the above embodiment may be replaced by optical waveguides formed in a substrate, or by optical fibers mounted on a multi-fiber connector.

Figure 15:
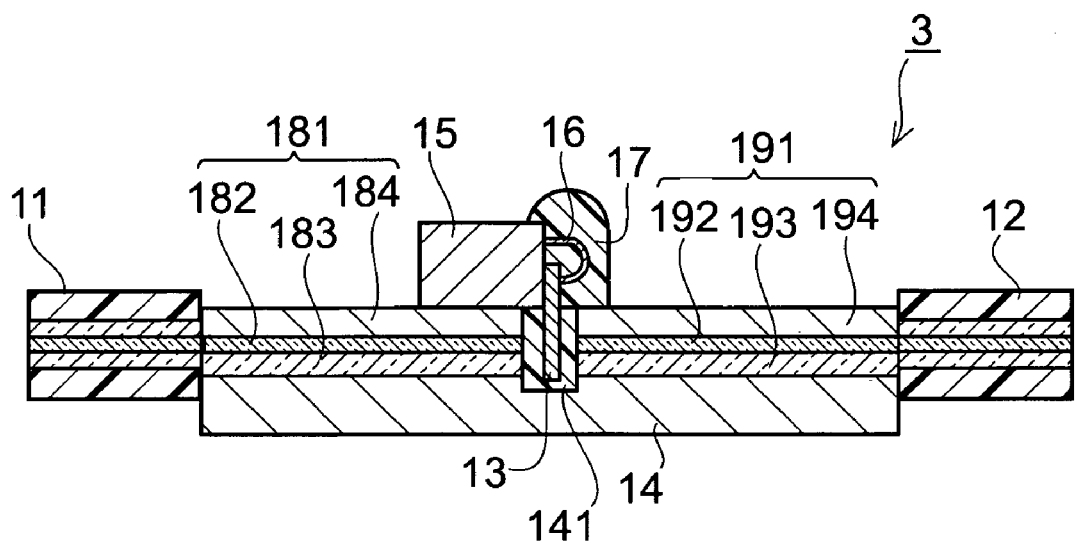
FIG. 15 is a sectional view of an optical power monitoring apparatus according to another embodiment of the present invention.

FIG. 15 is a sectional view of an optical power monitoring apparatus according to another embodiment of the present invention. In the optical power monitoring apparatus 3 shown in this figure, a first optical waveguide 181 and a second optical waveguide 191 are formed on a fixing member 14, and the fixing member 14 also serves as a substrate. The first optical waveguide 181 has a structure in which a core region 182 of a rectangular cross section is sandwiched between an under-cladding layer 183 and an over-cladding layer 184. Likewise, the second optical waveguide 191 has a structure in which a core region 192 of a rectangular cross section is sandwiched between an under-cladding layer 193 and an over-cladding layer 194. Each of the light exit end of the first optical waveguide 181 and the light entrance end of the second optical waveguide 191 fronts on a groove 141 formed in the fixing member 14. A transmission type light receiver is inserted in the groove 141 located between the light exit end of the first optical waveguide 181 and the light entrance end of the second optical waveguide 191.

The optical power monitoring apparatus 3 of this configuration can also operate in the same manner as the aforementioned optical power monitoring apparatus 1 and achieve the effect similar to that by the optical power monitoring apparatus 1.

Figure 16:
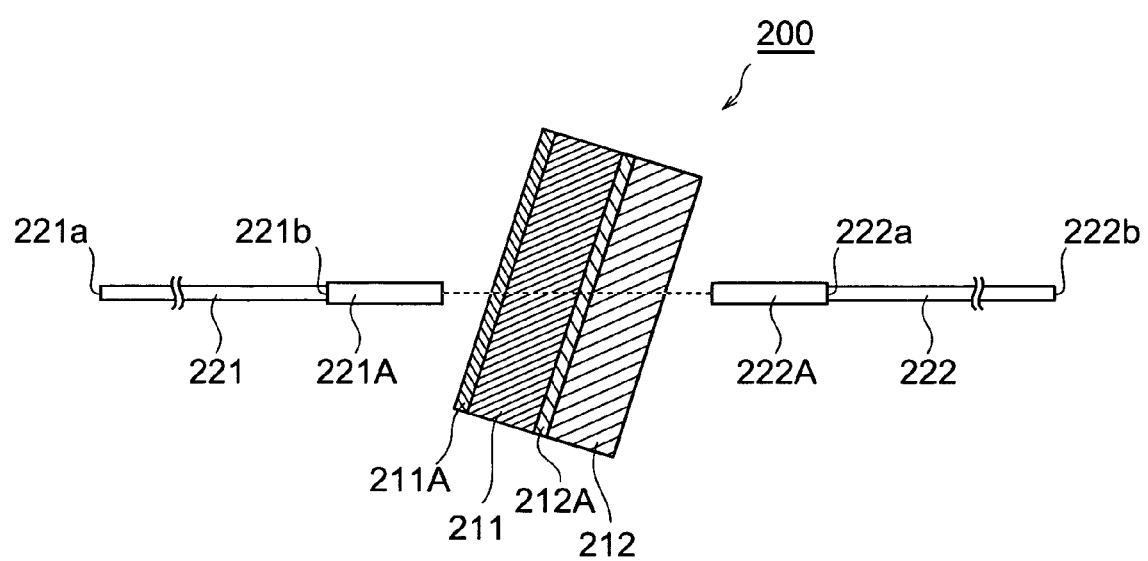
FIG. 16 is a configuration diagram of an optical power monitoring apparatus according to another embodiment of the present invention.

FIG. 16 is a configuration diagram of an optical power monitoring apparatus 200 according to an embodiment of the present invention. The optical power monitoring apparatus 200 shown in this figure has a light receiver 211 including an absorber layer 211A, a light receiver 212 including an absorber layer 212A, an optical fiber 221 with a collimator lens 221A at a distal end thereof, and an optical fiber 222 with a collimator lens 222A at a distal end thereof.

The optical fiber 221 has a light entrance end 221a and a light exit end 221b. Light from the exterior is injected through the light entrance end 221a into the interior of the optical fiber 221, is guided by the optical fiber 221, and is outputted from the light exit end 221b. The optical fiber 222 has a light entrance end 222a and a light exit end 222b. Light from the exterior is injected through the light entrance end 222a into the interior of the optical fiber 222, is guided by the optical fiber 222, and is outputted from the light exit end 222b.

The light receiver 211 absorbs part of incident light by the absorber layer 211A, outputs an electric signal at a value according to the power of light absorbed by the absorber layer 211A, and transmits the rest of the incident light. Similarly, the light receiver 212 absorbs part of incident light by the absorber layer 212A, outputs an electric signal at a value according to the power of light absorbed by the absorber layer 212A, and transmits the rest of the incident light. The light receiver 211 and the light receiver 212 are serially arranged on the optical path from the light exit end 221b of the optical fiber 221 to the light entrance end 222a of the optical fiber 222. The optical fiber 221 is located on the side of light receiver 211, and the optical fiber 222 on the side of light receiver 212.

Wavelength dependences of respective acceptance sensitivities of the light receivers 211 and 212 are different from each other. A wavelength dependence of an acceptance sensitivity of a light receiver can be varied by changing the thickness or absorption coefficient of the absorber layer or the like. In a preferred configuration, a ratio of respective acceptance sensitivities of the light receivers 211 and 212 monotonically increases or monotonically decreases at least in a continuous wavelength band of not less than 20 nm, or in the C-band (more preferably, in the wavelength range over the C-band and the L-band, and, still more preferably, in the wavelength range over the O-band to the U-band).

In this optical power monitoring apparatus 200, light incident to the light entrance end 221a of the optical fiber 221 travels through the interior of the optical fiber 221 to be outputted from the light exit end 221b. The light outputted from the light exit end 221b is collimated and outputted by the collimator lens 221A attached to the distal end of the optical fiber 221, to enter the light receiver 211. The light entering the light receiver 211 passes through the light receiver 211 and further passes through the light receiver 212 to emerge therefrom. Then the light emerging from the light receiver 212 is incident to the collimator lens 222A attached to the distal end of the optical fiber 222. The light emerging from the collimator lens 222A is incident to the light entrance end 222a of the optical fiber 222, travels through the interior of the optical fiber 222, and is then outputted from the light exit end 222b.

The absorber layer 211A is provided in the region where the light entering the light receiver 211 passes through the light receiver 211. As the light passes through this absorber layer 211A, part of the light is absorbed by the absorber layer 211A, and an electric signal according to the power of the absorbed light is outputted. Likewise, the absorber layer 212A is provided in the region where the light entering the light receiver 212 passes through the light receiver 212. As the light passes through this absorber layer 212A, part of the light is absorbed by the absorber layer 212A and an electric signal according to the power of the absorbed light is outputted.

Namely, in this optical power monitoring apparatus 200, the major part of light injected through the light entrance end 221a of the optical fiber 221 is outputted from the light exit end 222b of the optical fiber 222, while part of the light is absorbed by the absorber layers 211A, 212A. The light receivers 211, 212 output their respective electric signals. These electric signals indicate the power of the light injected through the light entrance end 221a of the optical fiber 221 and outputted from the light exit end 222b of the optical fiber 222. Since the wavelength dependences of respective acceptance sensitivities of the light receivers 211 and 212 are different from each other, they can also detect the wavelength of the incident light, based on the electric signals outputted from the light receivers 211, 212. This will be detailed later.

The light receivers of the structures shown in FIGS. 4 and 5 can be applied to the light receiver 211. The structure of the light receiver 212 is also similar to the aforementioned structure shown in FIG. 4 or FIG. 5. The wavelength dependences of respective acceptance sensitivities of the light receivers 211 and 212 can be made different from each other by using different thicknesses of the n⁻ type InGaAsP layer 803, 903 as an absorber layer, or by using different composition ratios of the n⁻ type InGaAsP layer 803, 903.

Figure 17:
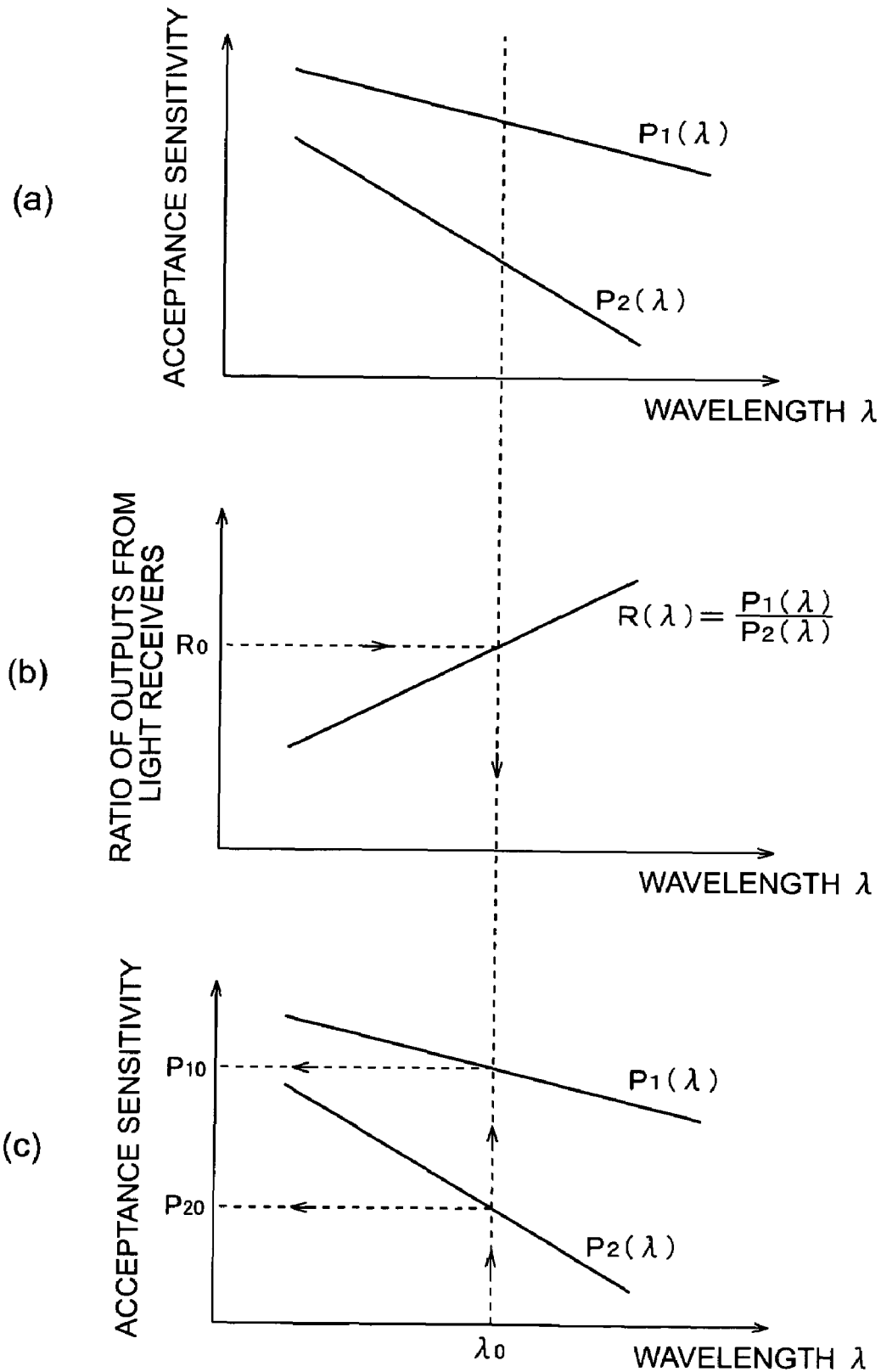
FIG. 17 is an illustration to illustrate an example of an optical power monitoring method using the optical power monitoring apparatus according to the other embodiment of the present invention.

FIG. 17 is an illustration to illustrate an example of an optical power monitoring method using the optical power monitoring apparatus 200 according to the present embodiment. In the same figure, (a) and (c) show the wavelength dependence of acceptance sensitivity $P_1(\lambda)$ of the light receiver 211 and the wavelength dependence of acceptance sensitivity $P_2(\lambda)$ of the light receiver 212. In the same figure, (b) shows the wavelength dependence of the ratio $R(\lambda)$ ($=P_1(\lambda)/P_2(\lambda)$) of the respective acceptance sensitivities of the light receivers 211 and 212.

As shown in (a) in the same figure, the wavelength dependence of acceptance sensitivity $P_1(\lambda)$ of the light receiver 211 is different from the wavelength dependence of acceptance sensitivity $P_2(\lambda)$ of the light receiver 212. As shown in (b) in the same figure, the ratio $R(\lambda)$ of the respective acceptance sensitivities of the light receivers 211 and 212 monotonically increases (or monotonically decreases) in a predetermined wavelength range. Supposing absorption of light in the light receiver 211 is so little that the powers of the light incident to the respective light receivers 211 and 212 are approximately equal, this ratio $R(\lambda)$ also indicates a ratio ($Y_1(\lambda)/Y_2(\lambda)$) of the value of the electric signal outputted from the light receiver 211, $Y_1(\lambda)$, to the value of the electric signal outputted from the light receiver 212, $Y_2(\lambda)$.

The wavelength dependences of the acceptance sensitivities $P_1(\lambda)$, $P_2(\lambda)$ and the ratio $R(\lambda)$ of the light receivers 211, 212 are preliminarily obtained and stored, for example, upon factory shipment or before a start of use. These wavelength dependences of the respective sensitivities $P_1(\lambda)$, $P_2(\lambda)$ and ratio $R(\lambda)$ may be stored as mathematical expressions with the wavelength $\lambda$ as a variable, or may be stored as correspondence tables to values at wavelengths $\lambda$.

Let us suppose that as an optical signal of a single wavelength fed through the light entrance end 221a of optical fiber 221 travels via the light receiver 211 and light receiver 212 and emerges from the light entrance end 222a of optical fiber 222, the light receiver 211 outputs an electric signal value $Y_{10}$ and the light receiver 212 outputs an electric signal value $Y_{20}$. The ratio $R_0$ of these values ($=Y_{10}/Y_{20}$) is obtained. Since the ratio $R(\lambda)$ monotonically increases (or monotonically decreases) as shown in (b) in the same figure, the wavelength $\lambda_0$ of the optical signal is determined based on the ratio $R_0$ obtained by measurement.

Furthermore, as shown in (c) in the same figure, the acceptance sensitivity $P_{10}$ of the light receiver 211 at this wavelength $\lambda_0$ ($=P_1(\lambda_0)$), and the acceptance sensitivity $P_{20}$ of the light receiver 212 at the wavelength $\lambda_0$ ($=P_2(\lambda_0)$) can be obtained. Then the power value $X_0$ of the optical signal ($=Y_{10}/P_{10}=Y_{20}/P_{20}$) is determined from these acceptance sensitivities $P_{10}$, $P_{20}$ of the light receivers 211, 212 and the output electric signal values $Y_{10}$, $Y_{20}$ of the light receivers 211, 212.

It is also possible to determine an operating situation of the optical power monitoring apparatus 200. Specifically, if there is no change (or little change) from the initial state in the wavelength dependences of the respective acceptance sensitivities of the light receivers 211 and 212, the optical power value $X_{10}$ ($=Y_{10}/P_{10}$) obtained from the initial acceptance sensitivity $P_{10}$ and output electric signal value $Y_{10}$ of one light receiver 211 must be equal to the optical power value $X_{20}$ ($=Y_{20}/P_{20}$) obtained from the initial acceptance sensitivity $P_{20}$ and output electric signal value $Y_{20}$ of the other light receiver 212. However, if either one of the light receiver 211 and the light receiver 212 deteriorates to change the wavelength dependence of its acceptance sensitivity from the initial state thereof, the optical power value $X_{10}$ obtained in one light receiver 211 will be different from the optical power value $X_{20}$ obtained in the other light receiver 212. Therefore, a situation of deterioration of the optical power monitoring apparatus 200 can be determined based on the difference between the value $X_{10}$ and the value $X_{20}$.

The optical power monitoring method described with FIG. 17 was the method wherein the number of wavelength of light to be detected by the optical power monitoring apparatus 200 with two light receivers 211, 212 was one and wherein the ratio of respective acceptance sensitivities of the two light receivers 211, 212 monotonically increased or monotonically decreased. In general, if the number of wavelengths of light to be detected by the optical power monitoring apparatus with N (N is an integer of not less than 2) light receivers is not more than (N−1) and if a ratio of respective acceptance sensitivities of any two light receivers out of the N light receivers monotonically increases or monotonically decreases, each wavelength and the power of light of each wavelength can be determined in the same manner.

On the other hand, it is also preferred in general that the number of wavelengths of light to be detected using the optical power monitoring apparatus with N (N is an integer of not less than 2) light receivers be not more than N, each wavelength be known, and a ratio of respective acceptance sensitivities of any two light receivers out of the N light receivers be dependent upon each wavelength. In this case, each wavelength can be determined and the power of light of each wavelength can also be determined.

Figure 18:
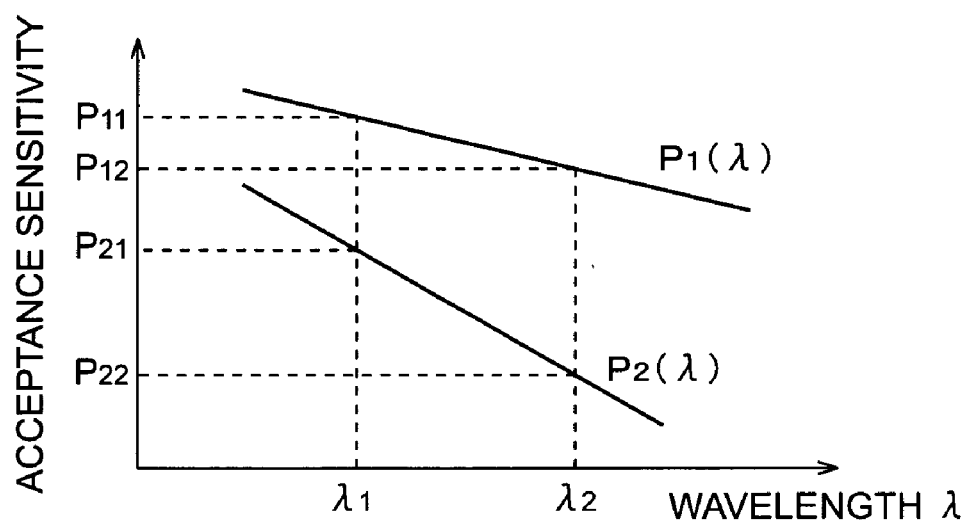
FIG. 18 is an illustration to illustrate another example of an optical power monitoring method using the optical power monitoring apparatus according to the other embodiment of the present invention.

FIG. 18 is an illustration to illustrate another example of the optical power monitoring method using the optical power monitoring apparatus 200 according to the present embodiment. This figure shows the wavelength dependence of acceptance sensitivity $P_1(\lambda)$ of the light receiver 211 and the wavelength dependence of acceptance sensitivity $P_2(\lambda)$ of the light receiver 212.

Let us suppose that as light of two known wavelengths $\lambda_1$, $\lambda_2$ fed through the light entrance end 221a of the optical fiber 221 travels through the light receiver 211 and light receiver 212 and emerges from the light exit end 222b of the optical fiber 222, the light receiver 211 outputs an electric signal value $Y_{10}$ and the light receiver 212 outputs an electric signal value $Y_{20}$. It is also supposed that the power of light of the wavelength $\lambda_1$ is $X_1$ and the power of light of the wavelength $\lambda_2$ is $X_2$. It is assumed that at the wavelength $\lambda_1$, the acceptance sensitivity of the light receiver 211 is $P_{11}$ ($=P_1(\lambda_1)$) and the acceptance sensitivity of the light receiver 212 $P_{21}$ ($=P_2(\lambda_1)$). It is also assumed that at the wavelength $\lambda_2$, the acceptance sensitivity of the light receiver 211 is $P_{12}$ ($=P_1(\lambda_2)$) and the acceptance sensitivity of the light receiver 212 $P_{22}$ ($=P_2(\lambda_2)$). At this time, the following relations hold among these parameters.

$$Y_{10}=P_{11}X_1+P_{12}X_2 \tag{1a}$$

$$Y_{20}=P_{21}X_1+P_{22}X_2 \tag{1b}$$

Since in these equations $Y_{10}$ and $Y_{20}$ are measured values and $P_{11}$, $P_{12}$, $P_{21}$, and $P_{22}$ are preliminarily known, the power $X_1$ of light of the wavelength $\lambda_1$ and the power $X_2$ of light of the wavelength $\lambda_2$ can be determined based thereon. For example, if the value of $X_1$ is 0 and if the value of $X_2$ is not 0, the input light is determined to be only the light of the wavelength $\lambda_2$. In this manner, it is feasible to determine which wavelength out of the two known wavelengths is the one of the incident light.

Light receiving devices according to embodiments of the present invention will be described below with reference to FIGS. 19 to 24.

Figure 19:
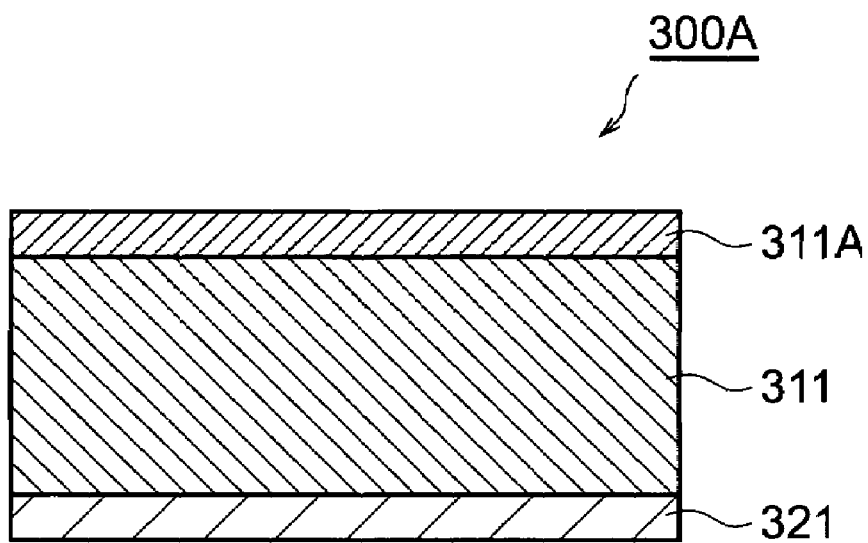
FIG. 19 is a configuration diagram of a light receiving device according to an embodiment of the present invention.

FIG. 19 is a sectional view of light receiving device 300A according to an embodiment of the present invention. The light receiving device 300A shown in this figure has a light receiver 311 including an absorber layer 311A, and an optical thin film 321 formed on a lower surface of this light receiver 311 (a surface opposite to the surface on the absorber layer 311A side). The light receiver 311 absorbs part of incident light by the absorber layer 311A, outputs an electric signal at a value according to the power of the absorbed light, and transmits the rest of the incident light. In a preferred configuration a reflection reducing film is formed on the upper surface of the light receiver 311 (the surface opposite to the surface on which the optical thin film 321 is formed).

The reflectance of the optical thin film 321 formed on the lower surface of the light receiver 311 is not less than 3% and preferably not less than 5% in a wavelength band consisting of at least one of the O-band, the S-band, the C-band, the L-band, and the U-band. The reflection on the optical thin film 321 may be total reflection (at the reflectance of not less than 97%) or partial reflection (at the reflectance of 47%-53%), and may have a wavelength dependence.

Figure 20:
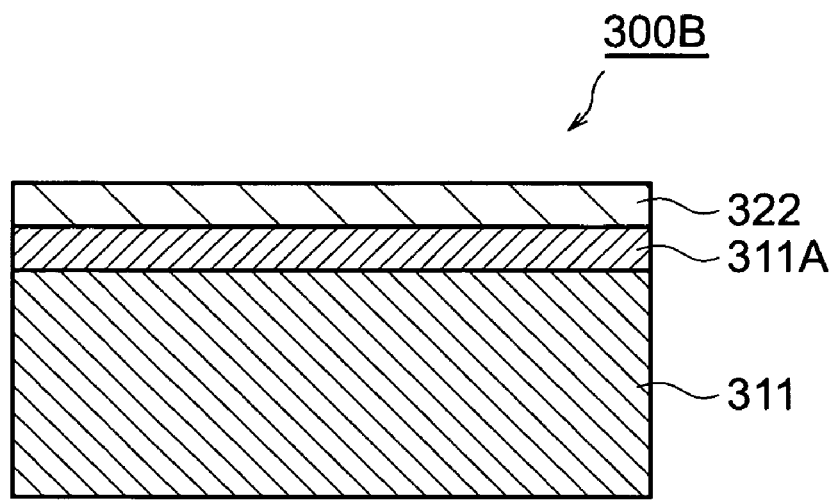
FIG. 20 is a configuration diagram of a light receiving device according to an embodiment of the present invention.

FIG. 20 is a sectional view of light receiving device 300B according to another embodiment. The light receiving device 300B shown in this figure has a light receiver 311 including an absorber layer 311A, and an optical thin film 322 formed on an upper surface of this light receiver 311 (a surface on the absorber layer 311A side). In a preferred configuration a reflection reducing film is formed on the upper surface of the light receiver 311 (the surface opposite to the surface on which the optical thin film 322 is formed).

The reflectance of the optical thin film 322 formed on the upper surface of the light receiver 311 is not less than 3% and preferably not less than 5% in a wavelength band consisting of at least one of the O-band, S-band, C-band, L-band, and U-band. The reflection on the optical thin film 322 may be total reflection (at the reflectance of not less than 97%) or partial reflection (at the reflectance of 47%-53%), and may have a wavelength dependence.

Figure 21:
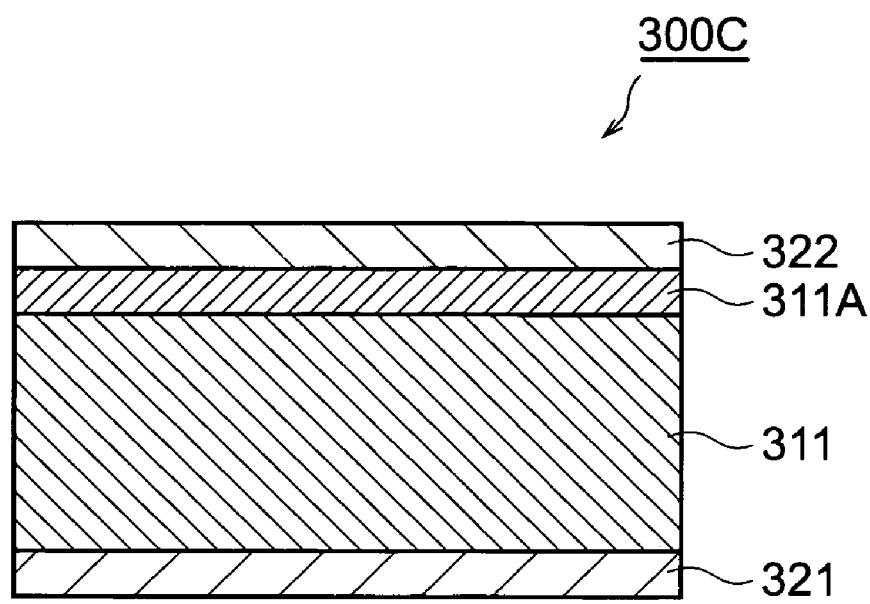
FIG. 21 is a configuration diagram of a light receiving device according to an embodiment of the present invention.

FIG. 21 is a sectional view of light receiving device 300C according to another embodiment. The light receiving device 300C shown in this figure has a light receiver 311 including an absorber layer 311A, an optical thin film 321 formed on a lower surface of the light receiver 311 (a surface opposite to the surface on the absorber layer 311A side), and an optical thin film 322 formed on an upper surface of the light receiver 311 (the surface on the absorber layer 311A side).

The reflectances of the respective optical thin films 321 and 322 are as described above, and the reflection characteristics of the two films may be the same. However, it is preferred that the reflection characteristics of the two films be different from each other. For example, a preferred configuration is such that the reflection on one optical thin film is total reflection and that the refection on the other optical thin film is partial reflection or has a wavelength dependence.

Figure 22:
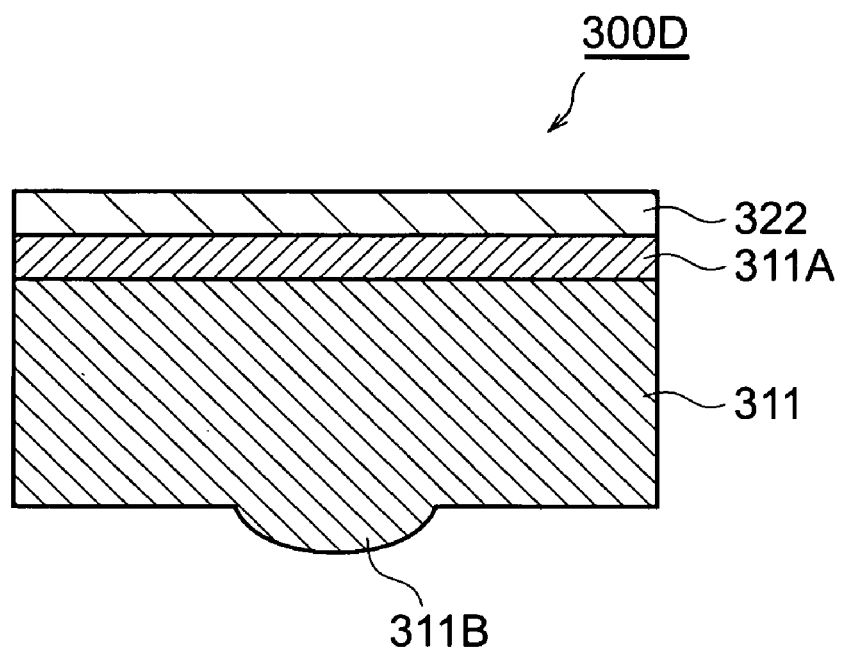
FIG. 22 is a configuration diagram of a light receiving device according to an embodiment of the present invention.

FIG. 22 is a sectional view of light receiving device 300D according to another embodiment. The light receiving device 300D shown in this figure has a light receiver 311 including an absorber layer 311A, and an optical thin film 322 formed on an upper surface of this light receiver 311 (a surface on the absorber layer 311A side), and a convex lens 311B is formed on the lower side of the light receiver 311. Since the convex lens 311B is formed in this manner, it can collimate or condense light incident into or emerging from the light receiver 311.

Figure 23:
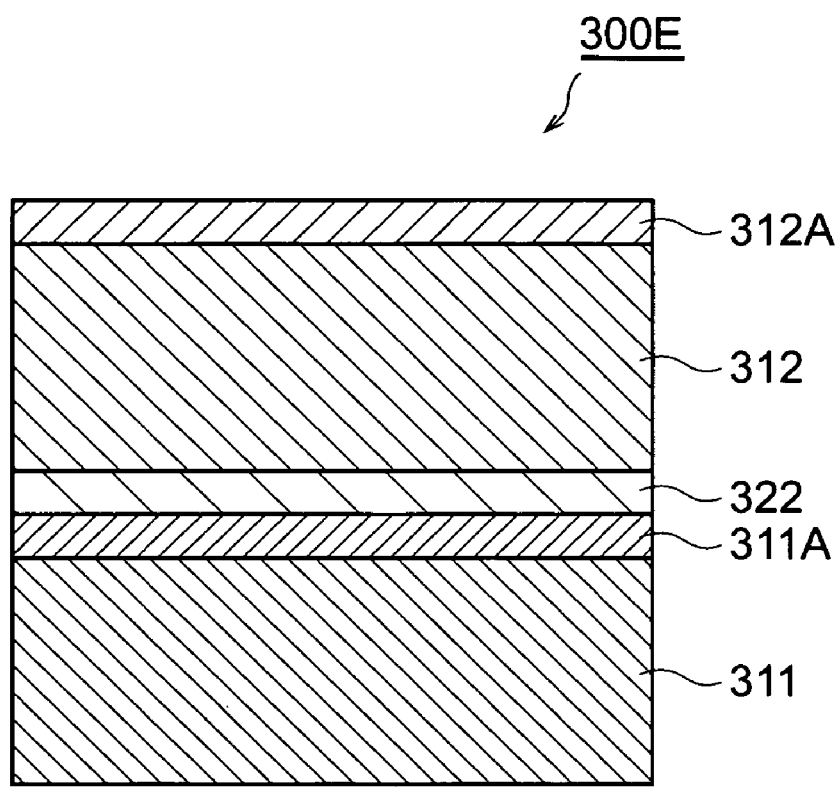
FIG. 23 is a configuration diagram of a light receiving device according to an embodiment of the present invention.

FIG. 23 is a sectional view of light receiving device 300E according to another embodiment. The light receiving device 300E shown in this figure has a light receiver 311 including an absorber layer 311A, a light receiver 312 including an absorber layer 312A, and an optical thin film 322 formed between these light receivers 311 and 312.

Figure 24:
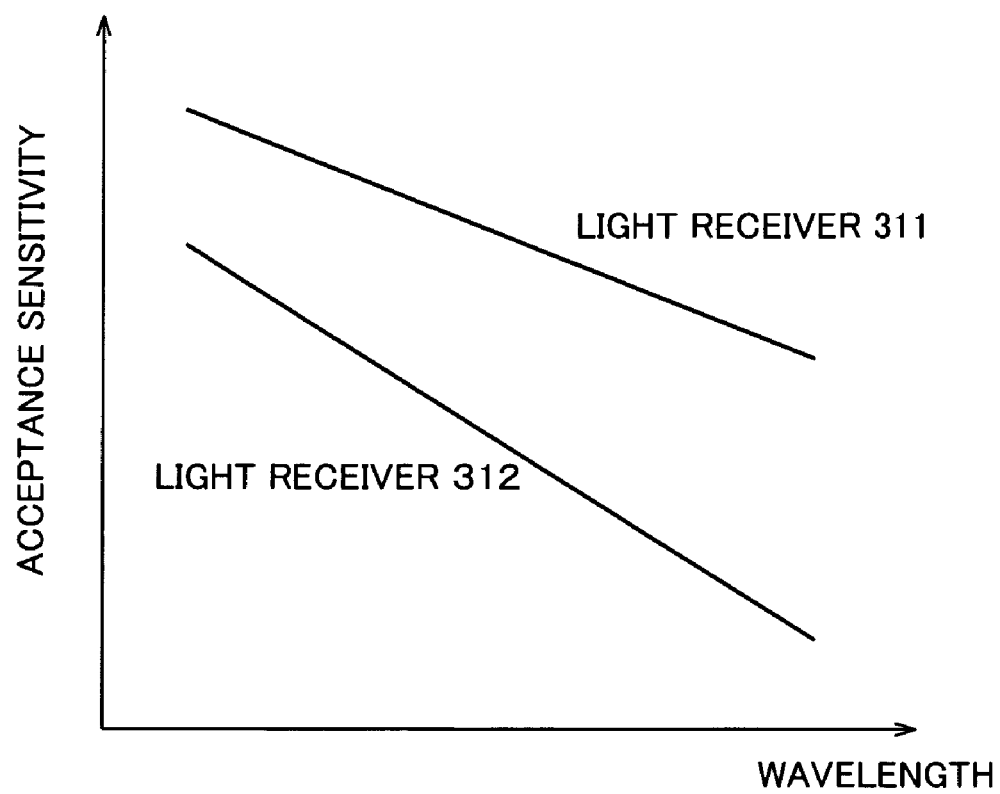
FIG. 24 is an illustration showing wavelength dependences of respective acceptance sensitivities of light receivers 311, 312.

As the light receiver 311 does, the light receiver 312 absorbs part of incident light by the absorber layer 312A, outputs an electric signal at a value according to the power of the absorbed light, and transmits the rest of the incident light. It is preferred that the wavelength dependences of respective acceptance sensitivities (conversion efficiencies from received light power to output electricity) of the light receivers 311 and 312 be different from each other as shown in FIG. 24 and that the reflectance on the optical thin film 322 have a wavelength dependence. The wavelength dependence of acceptance sensitivity of each light receiver can be altered by changing the thickness of the absorber layer, the carrier density, and so on.

The light receiver of the structure shown in FIG. 4 can be applied to the light receivers 311 and 312. In the case of the light receiver 311 or the light receiver 312, at least one of the thin films 808 and 810 is the aforementioned optical thin film having the reflectance of not less than 3%.

It is also possible to apply the light receiver of the structure shown in FIG. 5, to the light receiver 311 and the light receiver 312. In the case of the light receiver 311 or the light receiver 312, at least one of the thin films 908 and 910 is the aforementioned optical thin film having the reflectance of not less than 3%.

Embodiments of optical power monitoring apparatus using the light receiving devices as described above will be described below with reference to FIGS. 25 to 31.

Figure 25:
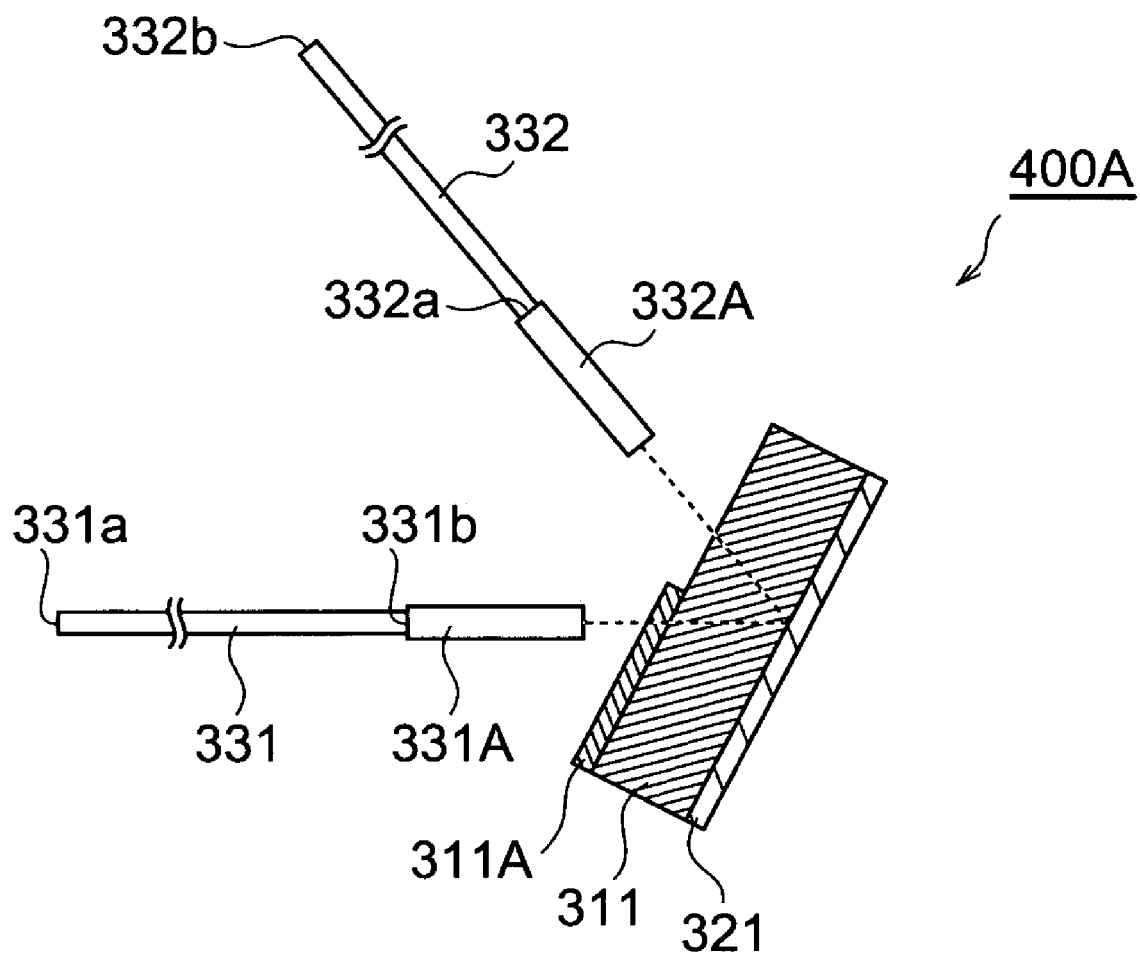
FIG. 25 is a configuration diagram of an optical power monitoring apparatus according to an embodiment of the present invention.

FIG. 25 is a configuration diagram of optical power monitoring apparatus 400A according to an embodiment of the present invention. The optical power monitoring apparatus 400A shown in this figure has a light receiver 311 including an absorber layer 311A, an optical thin film 321 formed on a first surface (a surface opposite to the surface on the absorber layer 311A side) which is a lower surface of the light receiver 311, and optical fibers 331, 332. In the present embodiment, the reflection on the optical thin film 321 is total reflection and the reflectance is not less than 97%. The optical fibers 331, 332 are disposed each on the side of one surface of the light receiver 311.

The optical fiber 331 has a light entrance end 331a and a light exit end 331b. A collimator lens 331A is provided on the light exit end 331b. The optical fiber 332 has a light entrance end 332a and a light exit end 332b. A collimator lens 332A is provided on the light entrance end 332a. The absorber layer 311A is disposed on the optical path from the light exit end 331b of the optical fiber 331 to the light entrance end 332a of the optical fiber 332. The light exit end 331b of the optical fiber 331 and the light entrance end 332a of the optical fiber 332 are optically coupled by reflection on the optical thin film 321.

In this optical power monitoring apparatus 400A, light injected through the light entrance end 331a into the interior of the optical fiber 331 is guided by the optical fiber 331 and is outputted from the light exit end 331b. The light outputted from the light exit end 331b is collimated and outputted by the collimator lens 331A attached to the distal end of optical fiber 331, and then enters the light receiver 311. The light entering the light receiver 311 passes through the light receiver 311, is reflected on the optical thin film 321, and again passes through the light receiver 311 to emerge therefrom. Then the light emerging from the light receiver 311 is incident to the collimator lens 332A attached to the distal end of the optical fiber 332. The light incident to the collimator lens 332A is injected through the light entrance end 332a into the interior of the optical fiber 332 and is guided by the optical fiber 332. The light guided by the optical fiber 332 is outputted from the light exit end 332b.

The absorber layer 311A is disposed on the optical path between the incidence of light into the light receiver 311 and the emission of the light from the light receiver 311 after the reflection on the optical thin film 321. In a preferred configuration, the absorber layer 311A is provided on either one of the optical path from the incidence into the light receiver 311 to the optical thin film 321 and the optical path from the reflection on the optical thin film 321 to the emission from the light receiver 311. Namely, it is preferred that the absorber layer 311A be provided on either one of the optical path from the light exit end 331b of the optical fiber 331 to the first surface and the optical path from the first surface to the light entrance end 332a of the optical fiber 332. As light passes through this absorber layer 311A, part of the light is absorbed in the absorber layer 311A and the light receiver outputs an electric signal at a value according to the power of this absorbed light.

Namely, in this optical power monitoring apparatus 400A, major part of light injected through the light entrance end 331a of the optical fiber 331 is outputted from the light exit end 332b of the optical fiber 332, and part of the light is absorbed to result in outputting an electric signal. The value of this electric signal indicates the power of the light injected through the light entrance end 331a of the optical fiber 331 and outputted from the light exit end 332b of the optical fiber 332. In this manner, the optical power monitoring apparatus 400A is provided with only the integrated form of the light receiver 311 and the optical thin film 321, besides the optical fibers being optical waveguide structures, between the light entrance end 331a of the optical fiber 331 and the light exit end 332b of the optical fiber 332. Therefore, the optical power monitoring apparatus 400A is easy in assembly and optical adjustment and is also easy in implementation of multiple-channel structure.

The apparatus may be constructed in the configuration wherein the collimator lenses are attached to the distal ends of the optical fibers 331, 332, but the apparatus may also be constructed in a configuration wherein the core diameter is expanded in a certain longitudinal range including the distal end of the optical fibers 331, 332. This configuration decreases NA at the distal end of the optical fibers 331, 332 and reduces the loss in optical coupling from the optical fiber 331 to the optical fiber 332.

Figure 26:
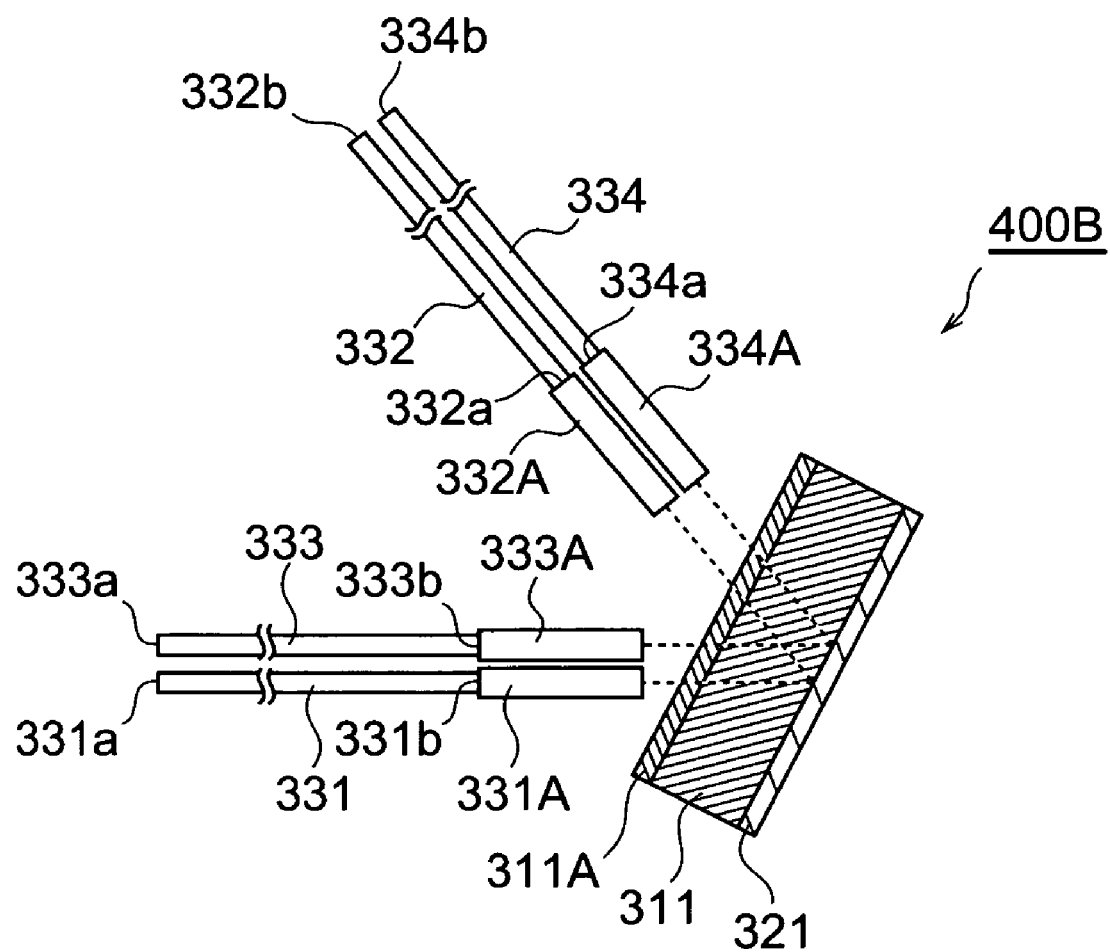
FIG. 26 is a configuration diagram of an optical power monitoring apparatus according to an embodiment of the present invention.

FIG. 26 is a configuration diagram of an optical power monitoring apparatus according to an embodiment of the present invention. The optical power monitoring apparatus 400B shown in this figure has a light receiver 311 including an absorber layer 311A, an optical thin film 321 formed on a first surface (a surface opposite to the surface on the absorber layer 311A side) which is a lower surface of this light receiver 311, and optical fibers 331-334. In the present embodiment, the reflection on the optical thin film 321 is total reflection and the reflectance is not less than 97%. The optical fibers 331-334 are disposed each on the side of one surface of the light receiver 311.

The optical fiber 331 has a light entrance end 331a and a light exit end 331b. A collimator lens 331A is provided on the light exit end 331b. The optical fiber 332 has a light entrance end 332a and a light exit end 332b. A collimator lens 332A is provided on the light entrance end 332a. The optical fiber 333 has a light entrance end 333a and a light exit end 333b. A collimator lens 333A is provided on the light exit end 333b. The optical fiber 334 has a light entrance end 334a and a light exit end 334b. A collimator lens 334A is provided on the light entrance end 334a. The absorber layer 311A is disposed on the optical path from the light exit end 331b to the light entrance end 332a and on the optical path from the light exit end 333b to the light entrance end 334a. The light exit end 331b and the light entrance end 332a are optically coupled by reflection on the optical thin film 321. The light exit end 333b and the light entrance end 334a are optically coupled by reflection on the optical thin film 321.

In this optical power monitoring apparatus 400B, light injected through the light entrance end 331a of the optical fiber 331 into the interior of the optical fiber 331 is guided by the optical fiber 331 and is outputted from the light exit end 331b. This light is collimated and outputted by the collimator lens 331A attached to the distal end of the optical fiber 331 and then enters the light receiver 311. The light entering the light receiver 311 passes through the light receiver 311, is reflected on the optical thin film 321, and again passes through the light receiver 311 to emerge therefrom. Then the light emerging from the light receiver 311 is incident to the collimator lens 332A attached to the distal end of the optical fiber 332. The light incident to the collimator lens 332A is injected through the light entrance end 332a of the optical fiber 332 into the interior of the optical fiber 332, is guided by the optical fiber 332, and is outputted from the light exit end 332b to the outside.

Similarly, light injected through the light entrance end 333a of the optical fiber 333 into the interior of the optical fiber 333 is guided by the optical fiber 333 and is outputted from the light exit end 333b. This light is collimated and outputted by the collimator lens 333A attached to the distal end of the optical fiber 333, and then enters the light receiver 311. The light entering the light receiver 311 passes through the light receiver 311, is reflected on the optical thin film 321, and again passes through the light receiver 311 to emerge therefrom. Then the light emerging from the light receiver 311 is incident to the collimator lens 334A attached to the distal end of the optical fiber 334. The light incident to the collimator lens 334A is injected through the light entrance end 334a of the optical fiber 334 into the interior of the optical fiber 334, is guided by the optical fiber 334, and is outputted from the light exit end 334b to the outside.

The absorber layer 311A is provided on the optical path between the incidence of the light into the light receiver 311 and the emission of the light from the light receiver 311 after the reflection on the optical thin film 321. In another preferred configuration, the absorber layer 311A is provided on either of the optical path from the incidence into the light receiver 311 to the optical thin film 321 and the optical path from the reflection on the optical thin film 321 to the emission from the light receiver 311. Namely, it is preferred that the absorber layer 311A be provided on either of the optical path from the light exit end 331b to the first surface and the optical path from the first surface to the light entrance end 332a. As light passes through this absorber layer 311A, part of the light is absorbed in the absorber layer 311A and the light receiver outputs an electric signal at a value according to the power of the absorbed light. Namely, this optical power monitoring apparatus 400B operates in the same manner and achieves the same effect as the optical power monitoring apparatus 400A, and in addition, the apparatus is constructed in the multi-channel structure.

Figure 27:
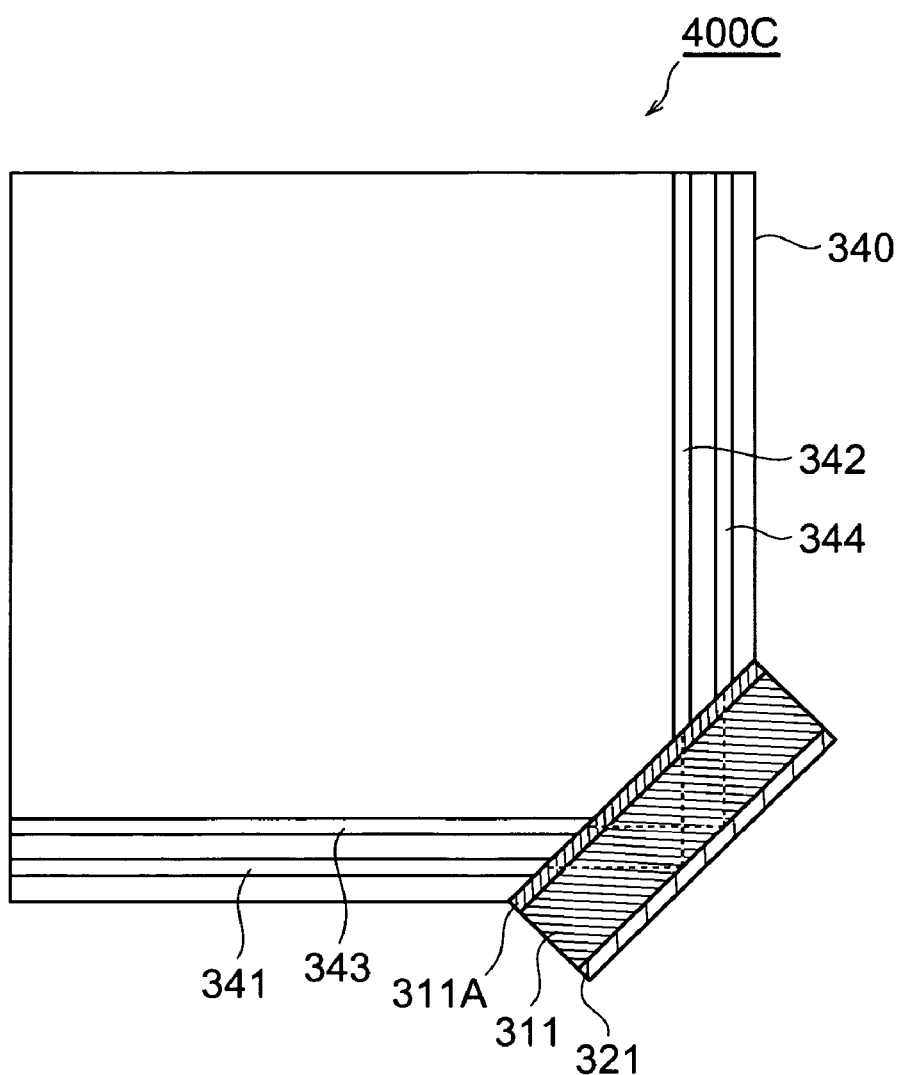
FIG. 27 is a configuration diagram of an optical power monitoring apparatus according to an embodiment of the present invention.

FIG. 27 is a configuration diagram of an optical power monitoring apparatus according to an embodiment of the present invention. The optical power monitoring apparatus 400C shown in this figure has a light receiver 311 including an absorber layer 311A, an optical thin film 321 formed on a lower surface of this light receiver 311 (a surface opposite to the surface on the absorber layer 311A side), and planar lightguides 341-344. In the present embodiment the reflection on the optical thin film 321 is total reflection and the reflectance is not less than 97%. Each of the planar lightguides 341-344 is an optical waveguide formed on a substrate 340 of flat plate shape. The planar lightguides 341-344 are provided each on the side of one surface of the light receiver 311.

In this optical power monitoring apparatus 400C, light injected through the light entrance end of the planar lightguide 341 is guided by the planar lightguide 341, and is outputted from the light exit end of the planar lightguide 341 to enter the light receiver 311. The light entering the light receiver 311 passes through the light receiver 311, is reflected on the optical thin film 321, and again passes through the light receiver 311 to emerge therefrom. Then the light emerging from the light receiver 311 is incident to the light entrance end of the planar lightguide 342, is guided by the planar lightguide 342, and is outputted from the light exit end of the planar lightguide 342.

Similarly, light injected through the light entrance end of the planar lightguide 343 is guided by the planar lightguide 343, and is outputted from the light exit end of the planar lightguide 343 to enter the light receiver 311. The light entering the light receiver 311 passes through the light receiver 311, is reflected on the optical thin film 321, and again passes through the light receiver 311 to emerge therefrom. Then the light emerging from the light receiver 311 is incident to the light entrance end of the planar lightguide 344, is guided by the planar lightguide 344, and is outputted from the light exit end of the planar lightguide 344.

The absorber layer 311A is provided on the optical path between the incidence of the light into the light receiver 311 and the emission of the light from the light receiver 311 after the reflection on the optical thin film 321. In another preferred configuration, the absorber layer 311A is provided on either of the optical path from the incidence into the light receiver 311 to the optical thin film 321 and the optical path from the reflection on the optical thin film 321 to the emission from the light receiver 311. As light passes through the absorber layer 311A, part of the light is absorbed in the absorber layer 311A, and the light receiver outputs an electric signal at a value according to the power of the absorbed light. Namely, this optical power monitoring apparatus 400C operates in the same manner and achieves the same effect as the aforementioned optical power monitoring apparatus 400B. In addition, this optical power monitoring apparatus 400C is much easier in assembly and optical adjustment because the optical waveguide structure between the two sets of input ports and output ports and the light receiver 311 is the integrated form of the planar lightguides 341-344.

Figure 28:
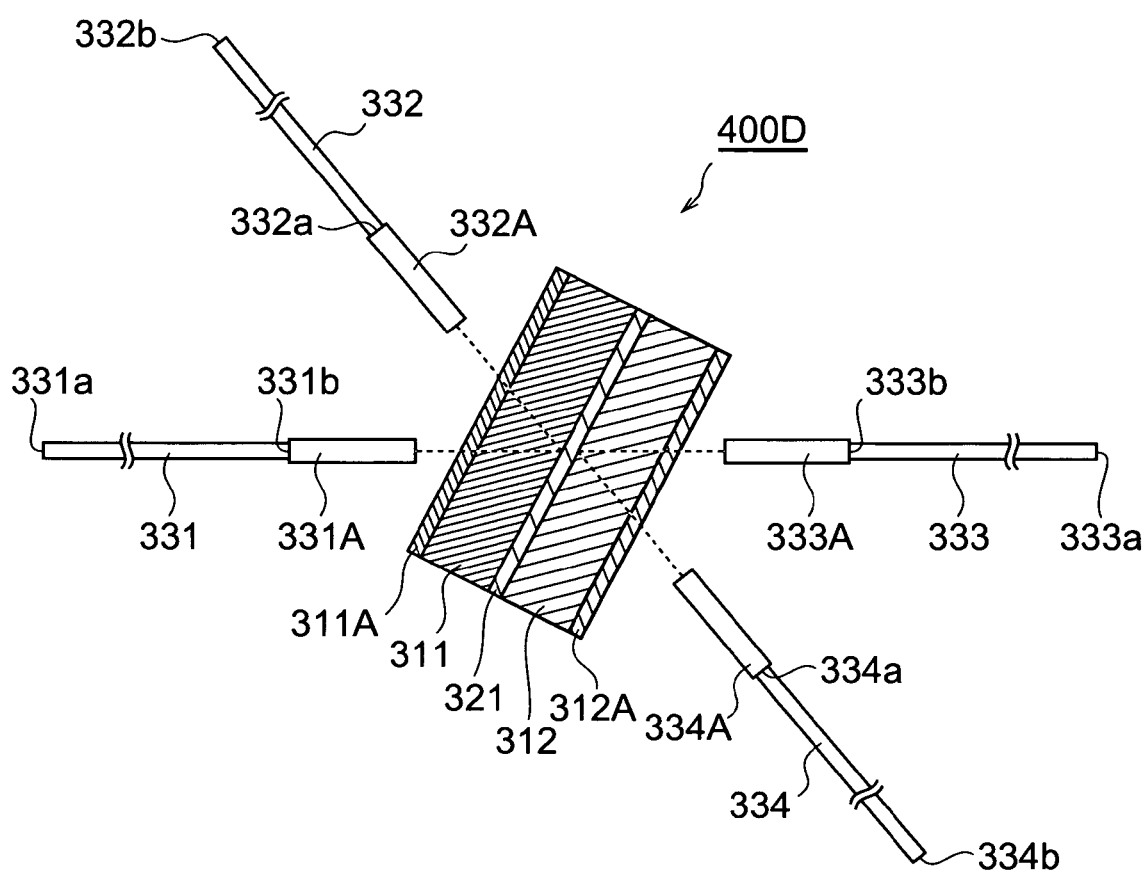
FIG. 28 is a configuration diagram of an optical power monitoring apparatus according to an embodiment of the present invention.

FIG. 28 is a configuration diagram of optical power monitoring apparatus 400D according to an embodiment of the present invention. The optical power monitoring apparatus 400D shown in this figure has a light receiver 311 including an absorber layer 311A, a light receiver 312 including an absorber layer 312A, and an optical thin film 321 formed between these light receivers 311 and 312. In the present embodiment, the reflection on the optical thin film 321 is total reflection and the reflectance is not less than 97%.

Optical fibers 331, 332 are provided each on the side of one light receiver 311. The optical fiber 331 has a light entrance end 331a and a light exit end 331b. A collimator lens 331A is provided on the light exit end 331b. The optical fiber 332 has a light entrance end 332a and a light exit end 332b. A collimator lens 332A is provided on the light entrance end 332a. The absorber layer 311A is provided on the optical path from the light exit end 331b to the light entrance end 332a. The light exit end 331b and the light entrance end 332a are optically coupled by reflection on the optical thin film 321.

Optical fibers 333, 334 are provided each on the side of the other light receiver 312. The optical fiber 333 has a light entrance end 333a and a light exit end 333b. A collimator lens 333A is provided on the light exit end 333b. The optical fiber 334 has a light entrance end 334a and a light exit end 334b. A collimator lens 334A is provided on the light entrance end 334a. The absorber layer 312A is provided on the optical path from the light exit end 333b to the light entrance end 334a. The light exit end 333b and the light entrance end 334a are optically coupled by reflection on the optical thin film 321.

In this optical power monitoring apparatus 400D, light from the exterior is injected through the light entrance end 331a into the interior of the optical fiber 331. This light is guided by the optical fiber 331 and is outputted from the light exit end 331b of the optical fiber 331. The light outputted from the light exit end 331b is collimated and outputted by the collimator lens 331A, and then enters the light receiver 311. The light entering the light receiver 311 passes through the light receiver 311, is reflected on the optical thin film 321, and again passes through the light receiver 311 to emerge therefrom. Then the light emerging from the light receiver 311 is incident to the collimator lens 332A attached to the distal end of the optical fiber 332. This light is injected through the light entrance end 332a into the interior of the optical fiber 332, is guided by the optical fiber 332, and is outputted from the light exit end 332b to the exterior.

Another optical signal from the exterior is injected through the light entrance end 333a into the interior of the optical fiber 333. This light is guided by the optical fiber 333 and is outputted from the light exit end 333b. The light outputted from the light exit end 333b is collimated and outputted by the collimator lens 333A attached to the distal end of the optical fiber 333, and then enters the light receiver 312. The light entering the light receiver 312 passes through the light receiver 312, is reflected on the optical thin film 321, and again passes through the light receiver 312 to emerge therefrom. Then the light emerging from the light receiver 312 is incident to the collimator lens 334A attached to the distal end of the optical fiber 334. This light is injected through the light entrance end 334a into the interior of the optical fiber 334, is guided by the optical fiber 334, and is outputted from the light exit end 334b to the exterior.

The absorber layer 311A is provided on the optical path between the incidence of the light into the light receiver 311 and the emission of the light from the light receiver 311 after the reflection on the optical thin film 321. In another preferred configuration, the absorber layer 311A is provided on either of the optical path from the incidence into the light receiver 311 to the optical thin film 321 and the optical path from the reflection on the optical thin film 321 to the emission from the light receiver 311. Namely, it is preferable that the absorber layer 311A be provided on either one of the optical path from the light exit end 331b to the optical thin film 321 and the optical path from the optical thin film 321 to the light entrance end 332a. As light passes through this absorber layer 311A, part of the light is absorbed in the absorber layer 311A, and the light receiver outputs an electric signal at a value according to the power of the absorbed light.

The absorber layer 312A is provided on the optical path between the incidence of the light into the light receiver 312 and the emission of the light from the light receiver 312 after the reflection on the optical thin film 321. In another preferred configuration, the absorber layer 312A is provided on either one of the optical path from the incidence into the light receiver 312 to the optical thin film 321 and the optical path from the reflection on the optical thin film 321 to the emission from the light receiver 312. Namely, it is preferable that the absorber layer 312A be provided on either one of the optical path from the light exit end 333b to the optical thin film 321 and the optical path from the optical thin film 321 to the light entrance end 334a. As light passes through this absorber layer 312A, part of the light is absorbed in the absorber layer 312A and the light receiver outputs an electric signal at a value according to the power of this absorbed light.

Namely, this optical power monitoring apparatus 400D operates in the same manner and achieves the same effect as the optical power monitoring apparatus 400B.

Figure 29:
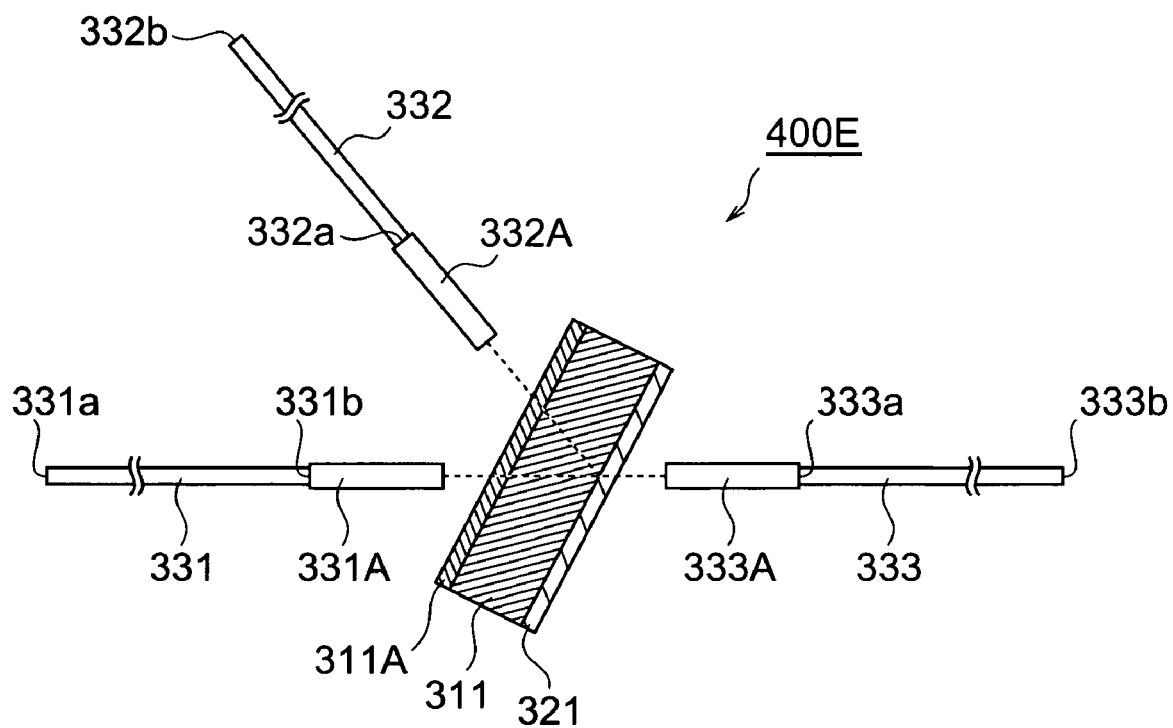
FIG. 29 is a configuration diagram of an optical power monitoring apparatus according to an embodiment of the present invention.

FIG. 29 is a configuration diagram of optical power monitoring apparatus 400E according to an embodiment of the present invention. The optical power monitoring apparatus 400E shown in this figure has a light receiver 311 including an absorber layer 311A, an optical thin film 321 formed on a first surface (a surface opposite to the surface on the absorber layer 311A side) being a lower surface of this light receiver 311, and optical fibers 331-333. In the present embodiment, the reflection on the optical thin film 321 is partial reflection, and the reflectance is 47%-53% or has a wavelength dependence.

The optical fibers 331, 332 are provided each on the side of one surface of the light receiver 311. The optical fiber 331 has a light entrance end 331a and a light exit end 331b, and a collimator lens 331A is provided on the light exit end 331b. The optical fiber 332 has a light entrance end 332a and a light exit end 332b, and a collimator lens 332A is provided on the light entrance end 332a. The absorber layer 311A is provided on the optical path from the light exit end 331b to the light entrance end 332a. The light exit end 331b and the light entrance end 332a are optically coupled by reflection on the optical thin film 321.

The optical fiber 333 is provided on the side of the other surface of the light receiver 311. The optical fiber 333 has a light entrance end 333a and a light exit end 333b, and a collimator lens 333A is provided on the light entrance end 333a. The optical thin film 321 is disposed between the light exit end 331b and the light entrance end 333a. The light exit end 331b and the light entrance end 333a are optically coupled by transmission through the optical thin film 321.

In this optical power monitoring apparatus 400E, light from the exterior is injected through the light entrance end 331a of optical fiber 331 into the interior of the optical fiber 331. This light is guided by the optical fiber 331, and is outputted from the light exit end 331b of the optical fiber 331. The light outputted from the light exit end 331b is collimated and outputted by the collimator lens 331A, and then enters the light receiver 311. The light entering the light receiver 311 passes through the light receiver 311, part of the light is reflected on the optical thin film 321, and the rest is transmitted. The light reflected on the optical thin film 321 again passes through the light receiver 311 to emerge therefrom, and the light is then incident to the collimator lens 332A attached to the distal end of the optical fiber 332. This light is injected through the light entrance end 332a into the interior of the optical fiber 332, is guided by the optical fiber 332, and is outputted from the light exit end 332b to the exterior. On the other hand, the light passing through the optical thin film 321 is incident to the collimator lens 333A attached to the distal end of the optical fiber 333. This light is injected through the light entrance end 333a into the interior of the optical fiber 333, is guided by the optical fiber 333, and is outputted through the light exit end 333b to the exterior.

The absorber layer 311A is provided on the optical path between the incidence of light into the light receiver 311 and arrival at the optical thin film 321. As light passes through this absorber layer 311A, part of the light is absorbed in the absorber layer 311A, and the light receiver outputs an electric signal at a value according to the power of the absorbed light. Where the reflection on the optical thin film 321 is partial reflection, the light is bifurcated in this optical thin film 321. On the other hand, where the reflectance of the optical thin film 321 has a wavelength dependence, the light is spectrally decomposed in this optical thin film 321.

Namely, in this optical power monitoring apparatus 400E, light incident to the input port (light entrance end 331a) is branched or spectrally decomposed in the optical thin film 321 to be outputted from the first output port (light exit end 332b) or from the second output port (light exit end 333b), and part of the light is absorbed to result in outputting an electric signal. The value of this electric signal indicates the power of the light injected into the input port and outputted from the output port.

In the optical power monitoring apparatus 400E, as described above, only the integrated form of the light receiver 311 and the optical thin film 321 is provided besides the optical fibers being optical waveguide structures, between the input port and the output ports. Therefore, the optical power monitoring apparatus 400E is easy in assembly and optical adjustment and also easy in implementation of multi-channel structure, and further enables branching or spectral decomposition.

Figure 30:
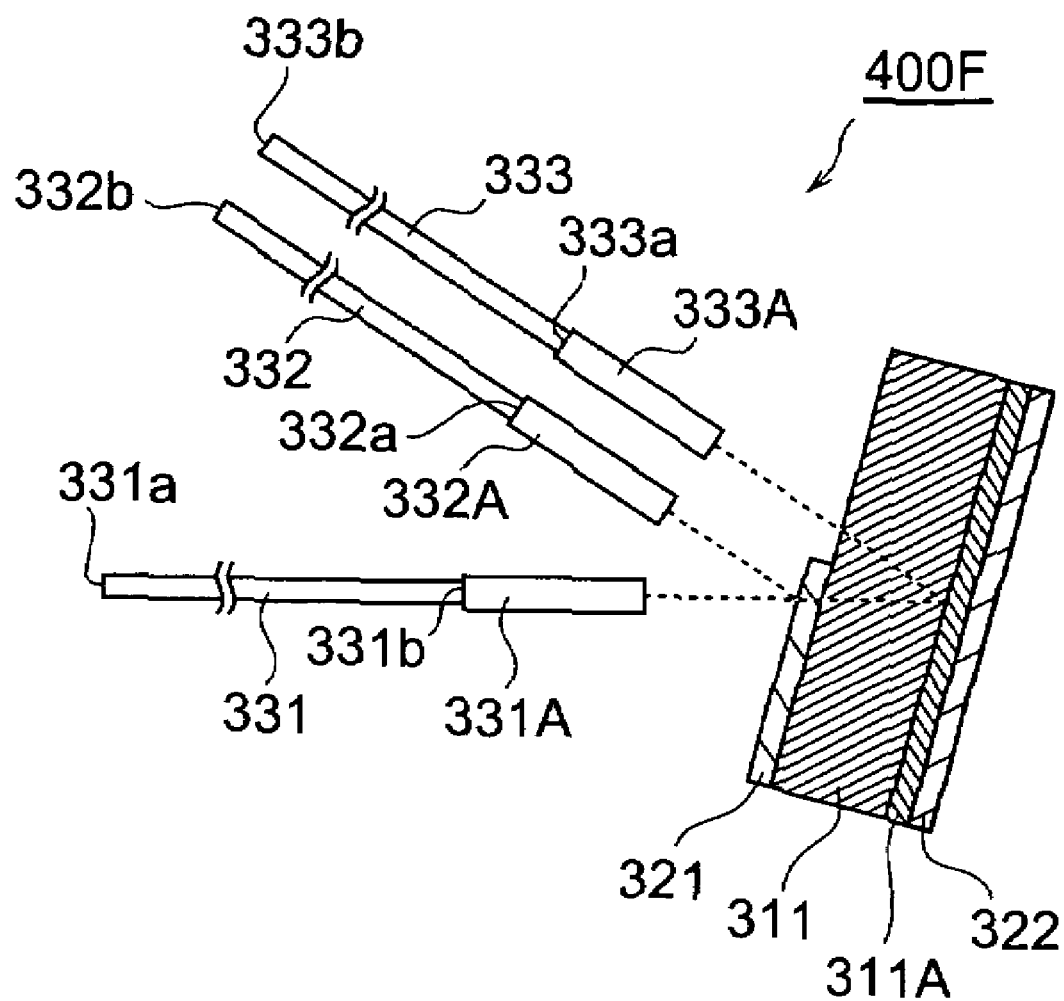
FIG. 30 is a configuration diagram of an optical power monitoring apparatus according to an embodiment of the present invention.

FIG. 30 is a configuration diagram of optical power monitoring apparatus 400F according to an embodiment of the present invention. The optical power monitoring apparatus 400F shown in this figure has a light receiver 311 including an absorber layer 311A, an optical thin film 321 formed on a first surface (a surface opposite to the surface on the absorber layer 311A side) being a lower surface of the light receiver 311, an optical thin film 322 formed on a second surface (the surface on the absorber layer 311A side) being an upper surface of the light receiver 311, and optical fibers 331-333. The absorber layer 311A is provided between the first surface and the second surface. In the present embodiment, the reflection on the optical thin film 321 is partial reflection, and the reflectance is 47%-53% or has a wavelength dependence. The reflection on the optical thin film 322 is total reflection and the reflectance is not less than 97%.

The optical fibers 331-333 are provided each on the side of optical thin film 321. The optical fiber 331 has a light entrance end 331a and a light exit end 331b, and a collimator lens 331A is provided on the light exit end 331b. The optical fiber 332 has a light entrance end 332a and a light exit end 332b, and a collimator lens 332A is provided on the light entrance end 332a. The optical fiber 333 has a light entrance end 333a and a light exit end 333b, and a collimator lens 333A is provided on the light entrance end 333a.

The light exit end 331b and the light entrance end 332a are optically coupled by reflection on the optical thin film 321. The light exit end 331b and the light entrance end 333a are optically coupled by transmittance through the optical thin film 321 and reflection on the optical thin film 322.

In this optical power monitoring apparatus 400F, light from the exterior is injected through the light entrance end 331a into the interior of the optical fiber 331. This light is guided by the optical fiber 331 and is outputted from the light exit end 331b. The light outputted from the light exit end 331b is collimated and outputted by the collimator lens 331A, the light is incident to the optical thin film 321, and part of the light is reflected on the optical thin film 321. The rest of the light passes through the optical thin film 321. The light reflected on the optical thin film 321 is then incident to the collimator lens 332A attached to the distal end of the optical fiber 332. This light is injected through the light entrance end 332a into the interior of the optical fiber 332, is guided by the optical fiber 332, and is outputted from the light exit end 332b to the exterior. On the other hand, the light passing through the optical thin film 321 passes through the light receiver 311, is reflected on the optical thin film 322, and again passes through the light receiver 311 to emerge therefrom. The light emerging from the light receiver 311 is then incident, without passing through the optical thin film 321, into the collimator lens 333A attached to the distal end of the optical fiber 333. This light is injected through the light entrance end 333a into the interior of the optical fiber 333, is guided by the optical fiber 333, and is outputted from the light exit end 333b.

The absorber layer 311A is provided on the optical path between the incidence of light into the light receiver 311 and arrival at the optical thin film 322. As light passes through this absorber layer 311A, part of the light is absorbed in the absorber layer 311A, and the light receiver outputs an electric signal at a value according to the power of the absorbed light. Where the reflection on the optical thin film 321 is partial reflection, the light is bifurcated by this optical thin film 321. On the other hand, where the reflectance of the optical thin film 321 has a wavelength dependence, the light is spectrally decomposed in this optical thin film 321.

Namely, in this optical power monitoring apparatus 400F, the light injected through the input port (light entrance end 331a) is branched or spectrally decomposed in the optical thin film 321 to be outputted from the first output port (light exit end 332b) or from the second output port (light exit end 333b), and part of the light is absorbed to result in outputting an electric signal. The value of this electric signal indicates the power of the light injected into the input port and outputted from the output port.

In the optical power monitoring apparatus 400F, as described above, only the integrated form of the light receiver 311 and the optical thin film 321 is disposed, besides the optical fibers being optical waveguide structures, between the input port and the output ports. Therefore, the optical power monitoring apparatus 400F is easy in assembly and optical adjustment and also easy in implementation of multiple-channel structure, and further enables branching or spectral decomposition.

Figure 31:
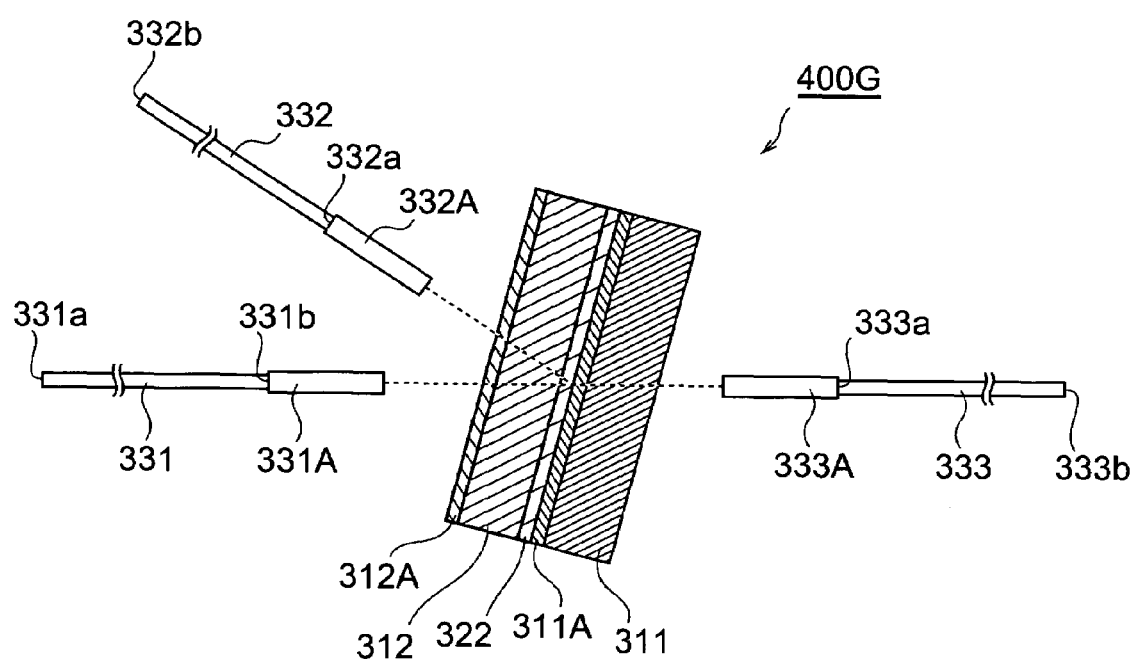
FIG. 31 is a configuration diagram of an optical power monitoring apparatus according to an embodiment of the present invention.

FIG. 31 is a configuration diagram of an optical power monitoring apparatus according to an embodiment of the present invention. The optical power monitoring apparatus 400G shown in this figure has a light receiver 311 including an absorber layer 311A, a light receiver 312 including an absorber layer 312A, and an optical thin film 322 formed between these light receivers 311 and 312. In the present embodiment, the reflection on the optical thin film 322 is partial reflection, and the reflectance is 47%-53% or has a wavelength dependence.

The optical fibers 331, 332 are provided each on the side of light receiver 312. The light exit end 331b of the optical fiber 331 and the light entrance end 332a of the optical fiber 332 are optically coupled by reflection on the optical thin film 322. The optical fiber 333 is provided on the side of light receiver 311. The light exit end 331b of the optical fiber 331 and the light entrance end 333a of the optical fiber 333 are optically coupled by transmission through the optical thin film 322.

In this optical power monitoring apparatus 400G, light from the exterior is injected through the light entrance end 331a into the interior of the optical fiber 331, is guided by the optical fiber 331, and is outputted from the light exit end 331b. The light outputted from the light exit end 331b is collimated and outputted by the collimator lens 331A, and then enters the light receiver 312. The light entering the light receiver 312 passes through the light receiver 312, part of the light is reflected on the optical thin film 322, and the rest is transmitted. The light reflected on the optical thin film 322 again passes through the light receiver 312 to emerge therefrom, and the light is then incident to the collimator lens 332A attached to the distal end of the optical fiber 332. This light is injected through the light entrance end 332a into the interior of the optical fiber 332, is guided by the optical fiber 332, and is outputted from the light exit end 332b to the exterior. On the other hand, the light passing through the optical thin film 322 passes through the light receiver 311 to emerge therefrom, and the light is then incident to the collimator lens 333A attached to the distal end of the optical fiber 333. This light is injected through the light entrance end 333a into the interior of the optical fiber 333, is guided by the optical fiber 333, and is outputted from the light exit end 333b to the exterior.

The absorber layer 312A is provided on the optical path of the light reflected on the optical thin film 322 in the light receiver 312. The light receiver 312 outputs an electric signal at a value according to the power of light absorbed in this absorber layer 312A. The absorber layer 311A is provided on the optical path of the light transmitted through the optical thin film 322 in the light receiver 311, and the light receiver 311 outputs an electric signal at a value according to the power of light absorbed in this absorber layer 311A. Where the reflection on the optical thin film 322 is partial reflection, the light is bifurcated in this optical thin film 322. On the other hand, where the reflectance of the optical thin film 322 has a wavelength dependence, the light is spectrally decomposed in this optical thin film 322.

Where the reflection on the optical thin film has the wavelength dependence, it is preferable that the acceptance sensitivities of the respective light receivers 311 and 312 have their respective wavelength dependences different from each other. Namely, it is preferred that the acceptance sensitivity of the light receiver 312 be high at wavelengths where the reflectance is high on the optical thin film 322. On the other hand, it is preferred that the acceptance sensitivity of the light receiver 311 be high at wavelengths where the transmittance is high in the optical thin film 322.

Namely, in this optical power monitoring apparatus 400G, the light injected through the input port (light entrance end 331a) is branched or spectrally decomposed in the optical thin film 322 to be outputted from the first output port (light exit end 332b) or from the second output port (light exit end 333b), and part of each light after branched or spectrally decomposed is absorbed to result in outputting an electric signal. The value of this electric signal indicates the power of the light injected into the input port and outputted from each output port.

In the optical power monitoring apparatus 400G, as described above, only the integrated form of the light receiver 311, the light receiver 312, and the optical thin film 322 is provided, besides the optical fibers being optical waveguide structures, between the input port and the output ports. Therefore, the optical power monitoring apparatus 400G is easy in assembly and optical adjustment and also easy in implementation of multi-channel structure, and further enables branching or spectral decomposition.

As described above with the embodiments of the present invention, the present invention successfully provides the optical power monitoring apparatus easy in production and capable of suppressing the problem of crosstalk.

According to an aspect of the present invention, it is feasible to also detect the wavelength of the light to be monitored, and to accurately monitor the power of the light.

The principle of the present invention was illustrated and described with the preferred embodiments thereof, but it is to be understood by those skilled in the art that the present invention can be modified in arrangement and details without departing from the principle thereof. The present invention is by no means limited to the specific configurations disclosed in the embodiments thereof. Therefore, we claim the right to all modifications and changes falling within the scope of claims and within the scope of the spirit thereof.

What is claimed is:

1. An optical power monitoring apparatus comprising:
    an input optical waveguide having a light entrance end and a light exit end, and arranged to accept light from an exterior through the light entrance end into an interior thereof, guide the light, and output the light from the light exit end;
    a light receiver having an absorber layer for absorbing part of the light outputted from the light exit end of the input optical waveguide, and arranged to output an electric signal at a value according to a power of light absorbed by the absorber layer, and transmit the other part of the light outputted from the light exit end of the input optical waveguide; and
    an output optical waveguide having a light entrance end and a light exit end, and arranged to accept the light transmitted by the light receiver, through the light entrance end into an interior thereof, guide the light, and output the light from the light exit end,
    wherein the light receiver is provided on an optical path from the light exit end of the input optical waveguide to the light entrance end of the output optical waveguide, and
    the plane direction of the absorber layer crosses the optical path.

2. The optical power monitoring apparatus according to claim 1, further comprising a fixing member for fixing a relative positional relation among the input optical waveguide, the light receiver, and the output optical waveguide.

3. The optical power monitoring apparatus according to claim 1, wherein each of an optical path between the light exit end of the input optical waveguide and the light receiver, and an optical path between the light receiver and the light entrance end of the output optical waveguide is filled with a light transmitting medium.

4. The optical power monitoring apparatus according to claim 1, wherein a mode field diameter near the light exit end of the input optical waveguide is expanded, and wherein a mode field diameter near the light entrance end of the output optical waveguide is expanded.

5. The optical power monitoring apparatus according to claim 4, wherein the mode field diameter is uniform in a predetermined longitudinal range including the light exit end of the input optical waveguide, and wherein the mode field diameter is uniform in a predetermined longitudinal range including the light entrance end of the output optical waveguide.

6. The optical power monitoring apparatus according to claim 1, wherein a mode field diameter at the light exit end of the input optical waveguide is in a range of 20 µm to 70 µm, and wherein a mode field diameter at the light entrance end of the output optical waveguide is in a range of 20 µm to 70 µm.

7. An optical power monitoring apparatus comprising:
    an input optical waveguide having a light entrance end and a light exit end, and arranged to accept light from an exterior through the light entrance end into an interior thereof, guide the light, and output the light from the light exit end;
    a light receiver having an absorber layer for absorbing part of the light outputted from the light exit end of the input optical waveguide, and arranged to output an electric signal at a value according to a power of light absorbed by the absorber layer, and transmit the other part of the light outputted from the light exit end of the input optical waveguide; and
    an output optical waveguide having a light entrance end and a light exit end, and arranged to accept the light transmitted by the light receiver, through the light entrance end into an interior thereof, guide the light, and output the light from the light exit end, wherein the light receiver is provided on an optical path from the light exit end of the input optical waveguide to the light entrance end of the output optical waveguide, wherein an optical axis near the light exit end of the input optical waveguide is parallel to an optical axis near the light entrance end of the output optical waveguide, and wherein the light exit end of the input optical waveguide, the light entrance end of the output optical waveguide, a light entrance surface of the light receiver facing the light exit end of the input optical waveguide, and a light exit surface of the light receiver facing the light entrance end of the output optical waveguide are parallel to each other and are inclined at a predetermined angle relative to a plane normal to the optical axes.

8. The optical power monitoring apparatus according to claim 7, wherein the predetermined angle is in a range of 1° to 8°.

9. The optical power monitoring apparatus according to claim 7, wherein the optical axis near the light exit end of the input optical waveguide deviates from the optical axis near the light entrance end of the output optical waveguide so as to compensate for a path deviation due to passage of light through the light receiver.

10. The optical power monitoring apparatus according to claim 1, wherein a thickness of a region in the light receiver where the light outputted from the light exit end of the input optical waveguide and injected through the light entrance end of the output optical waveguide passes is smaller than a thickness of the other region in the light receiver.

11. An optical power monitoring apparatus comprising:
an input optical waveguide having a light entrance end and a light exit end, and arranged to accept light from an exterior through the light entrance end into an interior thereof, guide the light, and output the light from the light exit end;
a light receiver having an absorber layer for absorbing part of the light outputted from the light exit end of the input optical waveguide, and arranged to output an electric signal at a value according to a power of light absorbed by the absorber layer, and transmit the other part of the light outputted from the light exit end of the input optical waveguide; and
an output optical waveguide having a light entrance end and a light exit end, and arranged to accept the light transmitted by the light receiver, through the light entrance end into an interior thereof, guide the light, and output the light from the light exit end,
wherein the light receiver is provided on an optical path from the light exit end of the input optical waveguide to the light entrance end of the output optical waveguide, and
wherein an optical fiber having a mode field diameter smaller than a mode field diameter of the input optical waveguide is connected to the light entrance end of the input optical waveguide.

12. An optical power monitoring apparatus comprising:
an input optical waveguide having a light entrance end and a light exit end, and arranged to accept light from an exterior through the light entrance end into an interior thereof, guide the light, and output the light from the light exit end;
a light receiver having an absorber layer for absorbing part of the light outputted from the light exit end of the input optical waveguide, and arranged to output an electric signal at a value according to a power of light absorbed by the absorber layer, and transmit the other part of the light outputted from the light exit end of the input optical waveguide; and
an output optical waveguide having a light entrance end and a light exit end, and arranged to accept the light transmitted by the light receiver, through the light entrance end into an interior thereof, guide the light, and output the light from the light exit end,
wherein the light receiver is provided on an optical path from the light exit end of the input optical wave guide to the light entrance end of the output optical waveguide, and
wherein an optical fiber having a mode field diameter smaller than a mode field diameter of the output optical waveguide is connected to the light exit end of the output optical waveguide.

13. The optical power monitoring apparatus according to claim 1, further comprising:
another input optical waveguide having a light entrance end and a light exit end, and arranged to accept light from an exterior through the light entrance end into an interior thereof, guide the light, and output the light from the light exit end;
another light receiver having an absorber layer for absorbing part of the light outputted from the light exit end of the other input optical waveguide, and arranged to output an electric signal at a value according to a power of light absorbed by the absorber layer, and transmit the other part of the light outputted from the light exit end of the other input optical waveguide; and
another output optical waveguide having a light entrance end and a light exit end, and arranged to accept the light transmitted by the other light receiver, through the light entrance end into an interior thereof, guide the light, and output the light from the light exit end,
wherein the other light receiver is provided on an optical path from the light exit end of the other input optical waveguide to the light entrance end of the other output optical waveguide, and
wherein a set consisting of the input optical waveguide, the light receiver, and the output optical waveguide, and a set consisting of the other input optical waveguide, the other light receiver, and the other output optical waveguide are arranged in parallel.

14. The optical power monitoring apparatus according to claim 1, further comprising N−1 (N is an integer of not less than 2) other light receivers each of which has an absorber layer for absorbing part of the light outputted from the light exit end of the input optical waveguide and each of which is arranged to output an electric signal at a value according to a power of light absorbed by the absorber layer, and transmit the other part of the light outputted from the light exit end of the input optical waveguide,
wherein the N light receivers consisting of said light receiver and said N−1 other light receivers are serially arrayed on the optical path from the light exit end of the input optical waveguide to the light entrance end of the output optical waveguide,
wherein wavelength dependences of respective acceptance sensitivities of the N light receivers are different from each other, and
wherein light outputted from the light exit end of the input optical waveguide and transmitted by the N light receivers travels through the light entrance end of the output optical waveguide and is outputted from the light exit end of the output optical waveguide.

15. The optical power monitoring apparatus according to claim 14, wherein the respective absorber layers of the N light receivers have their respective thicknesses different from each other.

16. The optical power monitoring apparatus according to claim 14, wherein the N light receivers have their respective absorption coefficients different from each other.

17. The optical power monitoring apparatus according to claim 14, wherein a ratio of respective acceptance sensitivities of any two light receivers out of the N light receivers monotonically increases or monotonically decreases at least in a continuous wavelength band of not less than 20 nm.

18. The optical power monitoring apparatus according to claim 14, wherein a ratio of respective acceptance sensitivities of any two light receivers out of the N light receivers monotonically increases or monotonically decreases in a wavelength band consisting of at least one of the O-band, the S-band, the C-band, the L-band, and the U-band.

19. The optical power monitoring apparatus according to claim 1, further comprising an optical thin film having a reflectance of not less than 97% in a wavelength band consisting of at least one of the O-band, the S-band, the C-band, the L-band, and the U-band,
  wherein the light receiver further has a first surface on which the optical thin film is provided,
  wherein the absorber layer of the light receiver is provided on the optical path from the light exit end of the input optical waveguide to the light entrance end of the output optical waveguide, and
  wherein the light exit end of the input optical waveguide and the light entrance end of the output optical waveguide are optically coupled by reflection on the optical thin film.

20. The optical power monitoring apparatus according to claim 19, wherein the absorber layer is provided on either one of an optical path from the light exit end of the input optical waveguide to the first surface and an optical path from the first surface to the light entrance end of the output optical waveguide.

21. The optical power monitoring apparatus according to claim 19, further comprising:
  another input optical waveguide having a light entrance end and a light exit end, and arranged to accept light from an exterior through the light entrance end into an interior thereof, guide the light, and output the light from the light exit end; and
  another output optical waveguide having a light entrance end and a light exit end, and arranged to accept the light transmitted by the light receiver, through the light entrance end into an interior thereof, guide the light, and output the light from the light exit end,
  wherein the absorber layer is further provided on an optical path from the light exit end of the other input optical waveguide to the light entrance end of the other output optical waveguide,
  wherein the light receiver transmits part of light outputted from the light exit end of the other input optical waveguide and absorbed by the absorber layer, and outputs an electric signal at a value according to a power of light absorbed by the absorber layer, and
  wherein the light exit end of the other input optical waveguide and the light entrance end of the other output optical waveguide are optically coupled by reflection on the optical thin film.

22. The optical power monitoring apparatus according to claim 21, wherein an optical waveguide structure between the light receiver and each of the input optical waveguide, the output optical waveguide, the other input optical waveguide, and the other output optical waveguide is a planar lightguide.

23. The optical power monitoring apparatus according to claim 1, further comprising:
  another input optical waveguide having a light entrance end and a light exit end, and arranged to accept light from an exterior through the light entrance end into an interior thereof, guide the light, and output the light from the light exit end;
  another light receiver having an absorber layer for absorbing part of the light outputted from the light exit end of the other input optical waveguide, and arranged to output an electric signal at a value according to a power of light absorbed by the absorber layer, and transmit the other part of the light outputted from the light exit end of the other input optical waveguide;
  another output optical waveguide having a light entrance end and a light exit end, and arranged to accept the light transmitted by the other light receiver, through the light entrance end into an interior thereof, guide the light, and output the light from the light exit end; and
  an optical thin film having a reflectance of not less than 97% in a wavelength band consisting of at least one of the O-band, S-band, C-band, L-band, and U-band,
  wherein the other light receiver is provided on an optical path from the light exit end of the other input optical waveguide to the light entrance end of the other output optical waveguide,
  wherein the optical thin film is provided between the light receiver and the other light receiver,
  wherein the absorber layer of the light receiver is provided between the optical thin film and at least one of the light exit end of the input optical waveguide and the light entrance end of the output optical waveguide,
  wherein the absorber layer of the other light receiver is provided between the optical thin film and at least one of the light exit end of the other input optical waveguide and the light entrance end of the other output optical waveguide,
  wherein the light exit end of the input optical waveguide and the light entrance end of the output optical waveguide are optically coupled by reflection on the optical thin film, and
  wherein the light exit end of the other input optical waveguide and the light entrance end of the other output optical waveguide are optically coupled by reflection on the optical thin film.

24. The optical power monitoring apparatus according to claim 1, further comprising:
  another output optical waveguide having a light entrance end and a light exit end, and arranged to guide light injected through the light entrance end into an interior thereof, and output the light from the light exit end; and
  an optical thin film having a reflectance of 47%-53% in a wavelength band consisting of at least one of the O-band, S-band, C-band, L-band, and U-band,
  wherein the optical thin film is provided between the light exit end of the input optical waveguide and the light entrance end of the output optical waveguide,
  wherein the light exit end of the input optical waveguide and the light entrance end of the output optical waveguide are optically coupled by transmission through the optical thin film, and wherein the light exit end of the input optical waveguide and the light entrance end of the other output optical waveguide are optically coupled by reflection on the optical thin film.

25. The optical power monitoring apparatus according to claim 1, further comprising:
- another output optical waveguide having a light entrance end and a light exit end, and arranged to guide light injected through the light entrance end into an interior thereof, and output the light from the light exit end; and
- an optical thin film whose reflectance has a wavelength dependence in a wavelength band consisting of at least one of the O-band, S-band, C-band, L-band, and U-band,
- wherein the optical thin film is provided between the light exit end of the input optical waveguide and the light entrance end of the output optical waveguide,
- wherein the light exit end of the input optical waveguide and the light entrance end of the output optical waveguide are optically coupled by transmission through the optical thin film, and
- wherein the light exit end of the input optical waveguide and the light entrance end of the other output optical waveguide are optically coupled by reflection on the optical thin film.

26. The optical power monitoring apparatus according to claim 24, wherein the optical thin film is provided between the absorber layer and the light entrance end of the output optical waveguide.

27. The optical power monitoring apparatus according to claim 25, wherein the optical thin film is provided between the absorber layer and the light entrance end of the output optical waveguide.

28. The optical power monitoring apparatus according to claim 1, further comprising:
- another output optical waveguide having a light entrance end and a light exit end, and arranged to accept light through the light entrance end into an interior thereof, guide the light, and output the light from the light exit end;
- a first optical thin film having a reflectance of 47%-53% in a wavelength band consisting of at least one of the O-band, S-band, C-band, L-band, and U-band; and
- a second optical thin film having a reflectance of not less than 97% in said wavelength band,
- wherein the light receiver further has a first surface on which the first optical thin film is provided, and a second surface on which the second optical thin film is provided,
- wherein the absorber layer of the light receiver is provided between the first surface and the second surface,
- wherein the light exit end of the input optical waveguide and the light entrance end of the output optical waveguide are optically coupled by transmission through the first optical thin film and reflection on the second optical thin film, and
- wherein the light exit end of the input optical waveguide and the light entrance end of the other output optical waveguide are optically coupled by reflection on the first optical thin film.

29. The optical power monitoring apparatus according to claim 1, further comprising:
- another output optical waveguide having a light entrance end and a light exit end, and arranged to accept light through the light entrance end into an interior thereof, guide the light, and output the light from the light exit end;
- a first optical thin film whose reflectance has a wavelength dependence in a wavelength band consisting of at least one of the O-band, S-band, C-band, L-band, and U-band; and
- a second optical thin film having a reflectance of not less than 97% in said wavelength band,
- wherein the light receiver further has a first surface on which the first optical thin film is provided, and a second surface on which the second optical thin film is provided,
- wherein the absorber layer of the light receiver is provided between the first surface and the second surface,
- wherein the light exit end of the input optical waveguide and the light entrance end of the output optical waveguide are optically coupled by transmission through the first optical thin film and reflection on the second optical thin film, and
- wherein the light exit end of the input optical waveguide and the light entrance end of the other output optical waveguide are optically coupled by reflection on the first optical thin film.

30. The optical power monitoring apparatus according to claim 28, wherein the first optical thin film is provided on only the optical path from the light exit end of the input optical waveguide to the light entrance end of the output optical waveguide.

31. The optical power monitoring apparatus according to claim 29, wherein the first optical thin film is provided on only the optical path from the light exit end of the input optical waveguide to the light entrance end of the output optical waveguide.

32. The optical power monitoring apparatus according to claim 1, further comprising:
- another light receiver having an absorber layer for absorbing part of the light outputted from the light exit end of the input optical waveguide, and arranged to output an electric signal at a value according to a power of light absorbed by the absorber layer, and transmit the other part of the light outputted from the light exit end of the input optical waveguide;
- another output optical waveguide having a light entrance end and a light exit end, and arranged to accept light from the other light receiver through the light entrance end into an interior thereof, guide the light, and output the light from the light exit end; and
- an optical thin film having a reflectance of 47%-53% in a wavelength band consisting of at least one of the O-band, S-band, C-band, L-band, and U-band,
- wherein the optical thin film is provided between the light receiver and the other light receiver,
- wherein the absorber layer of the light receiver is provided between the light exit end of the input optical waveguide and the optical thin film,
- wherein the absorber layer of the other light receiver is provided between the optical thin film and the light entrance end of the other output optical waveguide,
- wherein the light exit end of the input optical waveguide and the light entrance end of the output optical waveguide are optically coupled by reflection on the optical thin film, and
- wherein the light exit end of the input optical waveguide and the light entrance end of the other output optical waveguide are optically coupled by transmission through the optical thin film.

33. The optical power monitoring apparatus according to claim 1, further comprising:
   another light receiver having an absorber layer for absorbing part of the light outputted from the light exit end of the input optical waveguide, and arranged to output an electric signal at a value according to a power of light absorbed by the absorber layer, and transmit the other part of the light outputted from the light exit end of the input optical waveguide;
   another output optical waveguide having a light entrance end and a light exit end, and arranged to accept light from the other light receiver through the light entrance end into an interior thereof, guide the light, and output the light from the light exit end; and
   an optical thin film whose reflectance has a wavelength dependence in a wavelength band consisting of at least one of the O-band, S-band, C-band, L-band, and U-band,
   wherein the optical thin film is provided between the light receiver and the other light receiver,
   wherein the absorber layer of the light receiver is provided between the light exit end of the input optical waveguide and the optical thin film,
   wherein the absorber layer of the other light receiver is provided between the optical thin film and the light entrance end of the other output optical waveguide,
   wherein the light exit end of the input optical waveguide and the light entrance end of the output optical waveguide are optically coupled by reflection on the optical thin film, and
   wherein the light exit end of the input optical waveguide and the light entrance end of the other output optical waveguide are optically coupled by transmission through the optical thin film.

34. The optical power monitoring apparatus according to claim 32, wherein acceptance sensitivities of the light receiver and the other light receiver have their respective wavelength dependences different from each other.

35. The optical power monitoring apparatus according to claim 33, wherein acceptance sensitivities of the light receiver and the other light receiver have their respective wavelength dependences different from each other.

36. The optical power monitoring apparatus according to claim 19, wherein each optical waveguide optically coupled with the light receiver is one having an expanded core.

37. The optical power monitoring apparatus according to claim 23, wherein each optical waveguide optically coupled with the light receiver is one having an expanded core.

38. The optical power monitoring apparatus according to claim 24, wherein each optical waveguide optically coupled with the light receiver is one having an expanded core.

39. The optical power monitoring apparatus according to claim 25, wherein each optical waveguide optically coupled with the light receiver is one having an expanded core.

40. The optical power monitoring apparatus according to claim 28, wherein each optical waveguide optically coupled with the light receiver is one having an expanded core.

41. The optical power monitoring apparatus according to claim 29, wherein each optical waveguide optically coupled with the light receiver is one having an expanded core.

42. The optical power monitoring apparatus according to claim 32, wherein each optical waveguide optically coupled with the light receiver is one having an expanded core.

43. The optical power monitoring apparatus according to claim 33, wherein each optical waveguide optically coupled with the light receiver is one having an expanded core.

44. An optical power monitoring method using the optical power monitoring apparatus as set forth in claim 14, comprising monitoring a power of light on the basis of the electric signals outputted from the N light receivers with input of the light into the optical power monitoring apparatus, and detecting a wavelength of the light.

45. The optical power monitoring method according to claim 44, comprising determining an operating situation of the optical power monitoring apparatus on the basis of the electric signals outputted from the N light receivers.

46. The optical power monitoring method according to claim 44, wherein the number of wavelengths of light to be detected is not more than (N−1), and
   wherein a ratio of respective acceptance sensitivities of any two light receivers out of the N light receivers monotonically increases or monotonically decreases in a range of the wavelengths of the light to be detected.

47. The optical power monitoring method according to claim 44, wherein the number of wavelengths of light to be detected is not more than N, and each wavelength is known, and
   wherein a ratio of respective acceptance sensitivities of any two light receivers out of the N light receivers is dependent upon each wavelength of the light to be detected.

48. The optical power monitoring method according to claim 44, wherein a power and a wavelength of light are detected based on a mathematical expression or a table indicating the wavelength dependences of the respective acceptance sensitivities of the N light receivers and based on the output electric signals.

* * * * *